(12) United States Patent
Schulte et al.

(10) Patent No.: US 11,427,314 B2
(45) Date of Patent: Aug. 30, 2022

(54) CONTROL SYSTEMS AND METHODS FOR ROTATING SYSTEMS

(71) Applicant: Bell Textron Inc., Fort Worth, TX (US)

(72) Inventors: Kynn Jerald Schulte, Arlington, TX (US); Troy Cyril Schank, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 649 days.

(21) Appl. No.: 15/980,452

(22) Filed: May 15, 2018

(65) Prior Publication Data

US 2019/0352002 A1 Nov. 21, 2019

(51) Int. Cl.
*B64C 27/57* (2006.01)
*B64C 29/00* (2006.01)
*B64D 45/00* (2006.01)
*B64C 11/28* (2006.01)

(52) U.S. Cl.
CPC .............. *B64C 27/57* (2013.01); *B64C 11/28* (2013.01); *B64C 29/0033* (2013.01); *B64D 45/00* (2013.01); *B64D 2045/0085* (2013.01)

(58) Field of Classification Search
CPC ..... B64C 27/50; B64C 27/57; B64C 29/0033; B64C 11/28; B64C 45/00; B64D 2045/0085
See application file for complete search history.

(56) References Cited

U.S. PATENT DOCUMENTS

| 3,404,852 A | 10/1968 | Sambell et al. |
| 3,592,412 A | 7/1971 | Glatfelter |
| 5,085,315 A | 2/1992 | Sambell |

(Continued)

FOREIGN PATENT DOCUMENTS

WO WO-2011159281 A1 12/2011

OTHER PUBLICATIONS

Wendong, G., et al., "Closed-Loop Dynamic Control Allocation for Aircraft with Multiple Actuators," Chinese Journal of Aeronautics, vol. 26, No. 3, 2013, pp. 676-686.

(Continued)

*Primary Examiner* — Eldon T Brockman
*Assistant Examiner* — Elton K Wong
(74) *Attorney, Agent, or Firm* — Shackelford, Bowen, McKinley & Norton, LLP

(57) ABSTRACT

In one embodiment, a local control system for a rotor assembly of an apparatus includes a first actuator disposed in the rotor assembly and configured to control motion of a first controllable element in the rotor assembly. The rotor assembly is mounted to the apparatus and is rotated responsive to torque and rotational energy provided thereto. The local control system also includes a first sensor disposed in the rotor assembly and configured to provide position feedback in relation to the first controllable element. The local control system also includes a first local control computer disposed in the rotor assembly and communicably coupled to a first central control computer disposed in the apparatus external to the rotor assembly, where the first local control computer is configured to transmit a control signal to the first actuator and receive a feedback signal from the first sensor.

15 Claims, 18 Drawing Sheets

(56) References Cited

U.S. PATENT DOCUMENTS

| | | |
|---|---|---|
| 7,604,202 B2 | 10/2009 | Froman et al. |
| 8,998,125 B2 | 4/2015 | Hollimon et al. |
| 9,156,545 B1 | 10/2015 | Fenny et al. |
| 9,327,831 B2 | 5/2016 | Schank et al. |
| 9,701,406 B2 | 7/2017 | Robertson et al. |
| 2012/0292456 A1 | 11/2012 | Hollimon et al. |
| 2014/0314130 A1* | 10/2014 | Sane .................. B64C 27/001 375/219 |
| 2015/0274290 A1* | 10/2015 | Fenny .................. B64C 27/50 244/17.25 |
| 2015/0298804 A1 | 10/2015 | Schank et al. |
| 2015/0367937 A1* | 12/2015 | Greenfield .......... G05D 1/0808 701/4 |
| 2016/0083087 A1 | 3/2016 | Schank et al. |
| 2016/0152329 A1 | 6/2016 | Tzeng et al. |
| 2016/0229531 A1 | 8/2016 | Robertson et al. |
| 2016/0348735 A1 | 12/2016 | Beckner et al. |
| 2017/0144746 A1 | 5/2017 | Schank et al. |
| 2018/0004229 A1* | 1/2018 | White .................. B64C 13/503 |

OTHER PUBLICATIONS

Van Schuppen, J.H., et al., "Control Distributed Systems—Tutorial and Overview," European Journal of Control, vol. 17, Sep. 9, 2011, pp. 1-35.

Speller, Charles H., "U.S. Appl. No. 16/035,409," filed Jul. 13, 2018.

\* cited by examiner

CONTROL SYSTEMS AND METHODS FOR ROTATING SYSTEMS

BACKGROUND

Technical Field

The present disclosure relates generally to control systems and methods and more particularly, but not by way of limitation, to control systems and methods for rotating systems.

History of Related Art

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by utilizing proprotors that can change their plane of rotation based on the operation being performed. Tiltrotor aircraft typically have a pair of nacelles mounted near the outboard ends of a fixed wing with each nacelle housing a propulsion system that provides torque and rotational energy to a proprotor. The nacelles are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. It has been found, however, that forward airspeed induced proprotor aeroelastic instability is a limiting factor relating to the maximum airspeed of tiltrotor aircraft in forward flight.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one embodiment, a local control system for a rotor assembly of an apparatus includes a first actuator disposed in the rotor assembly and configured to control motion of a first controllable element in the rotor assembly. The rotor assembly is mounted to the apparatus and is rotated responsive to torque and rotational energy provided thereto. The local control system also includes a first sensor disposed in the rotor assembly and configured to provide position feedback in relation to the first controllable element. The local control system also includes a first local control computer disposed in the rotor assembly and communicably coupled to a first central control computer disposed in the apparatus external to the rotor assembly, where the first local control computer is configured to transmit a control signal to the first actuator and receive a feedback signal from the first sensor.

In one embodiment, a method is performed by a local control computer in a rotor assembly of an apparatus. The method includes transmitting a control signal to an actuator in the rotor assembly. The rotor assembly is mounted to the apparatus and is rotated responsive to torque and rotational energy provided thereto. The actuator is configured to control motion of a first controllable element in the rotor assembly. The method also includes receiving a feedback signal from a sensor in the rotor assembly, the feedback signal including position feedback in relation to the first controllable element.

In one embodiment, a control system for an apparatus includes a local control system disposed in a rotor assembly of the apparatus. The rotor assembly is mounted to the apparatus and is rotated responsive to torque and rotational energy provided thereto. The local control system includes an actuator configured to control motion of a controllable element in the rotor assembly. The local control system also includes a sensor configured to provide position feedback in relation to the controllable element. The local control system also includes a local control computer configured to transmit a control signal to the actuator and receive a feedback signal from the sensor. In addition, the control system includes a first central control computer disposed in the apparatus external to the rotor assembly and communicably coupled to the local control computer, where the first central control computer is configured to transmit a command to the local control computer.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, as used herein, the term "coupled" may include direct or indirect coupling by any means, including moving and/or non-moving mechanical connections.

Figure 1A:
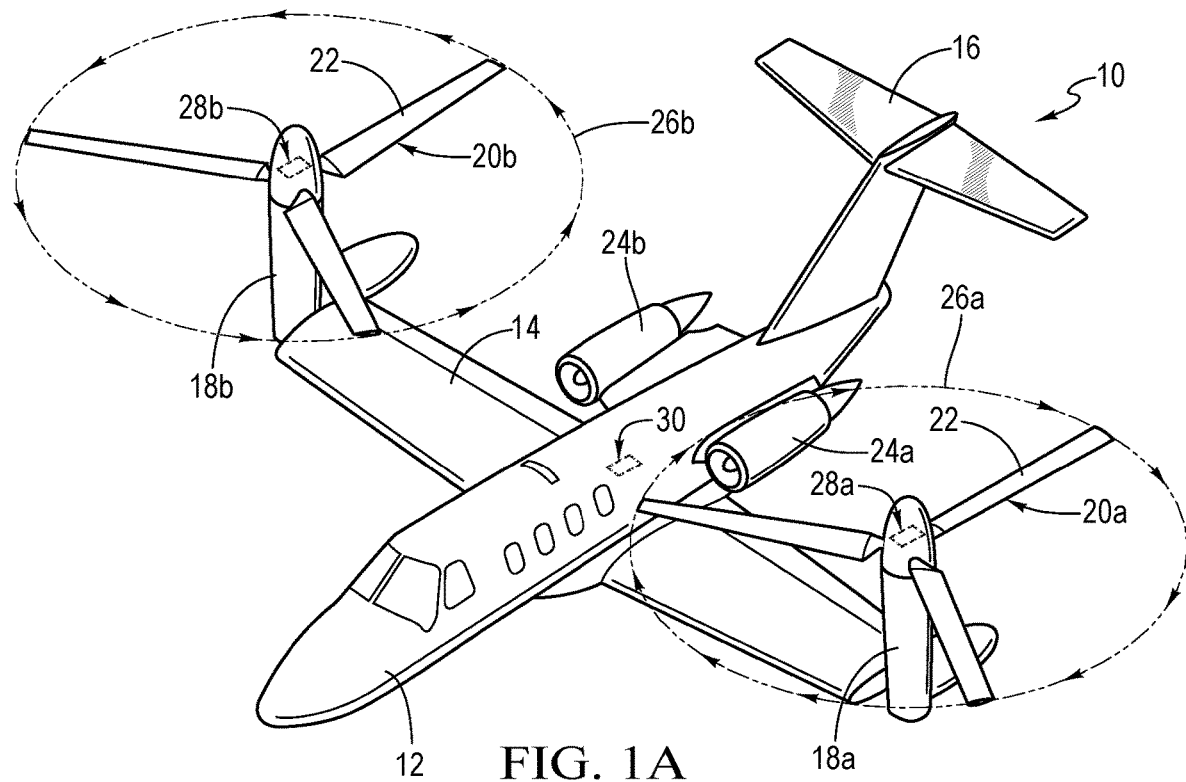
FIGS. 1A-1D are schematic illustrations of a tiltrotor aircraft in various flight modes in accordance with embodiments of the present disclosure.
Figure 1B:
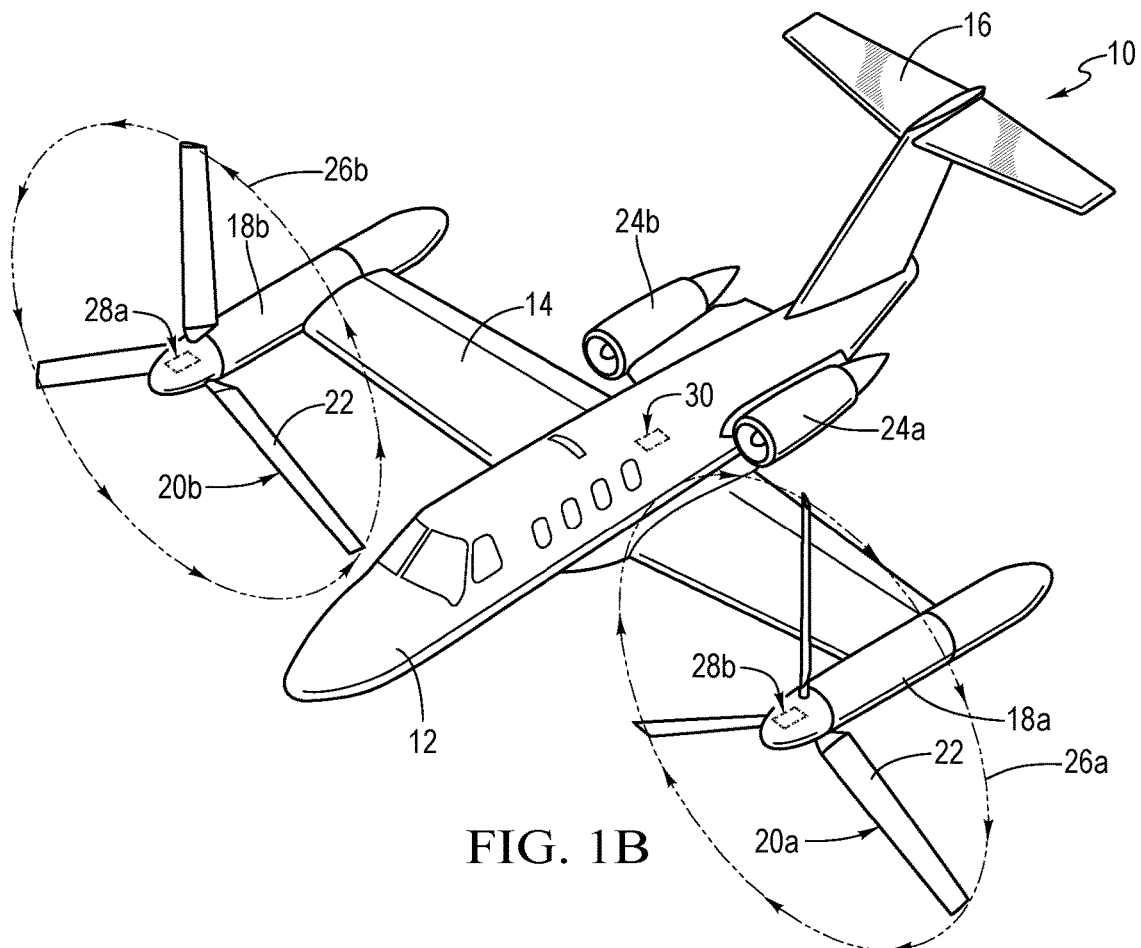
Figure 1C:
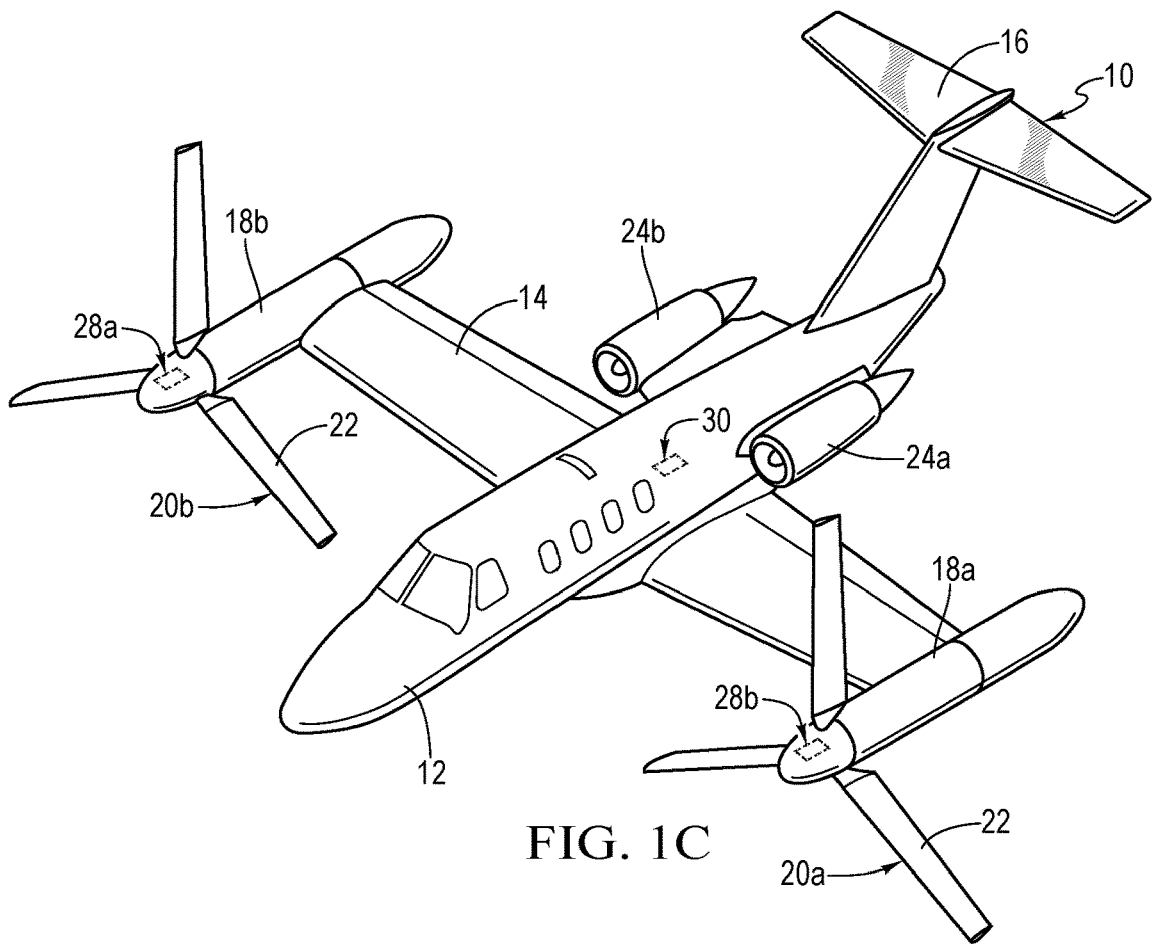
Figure 1D:
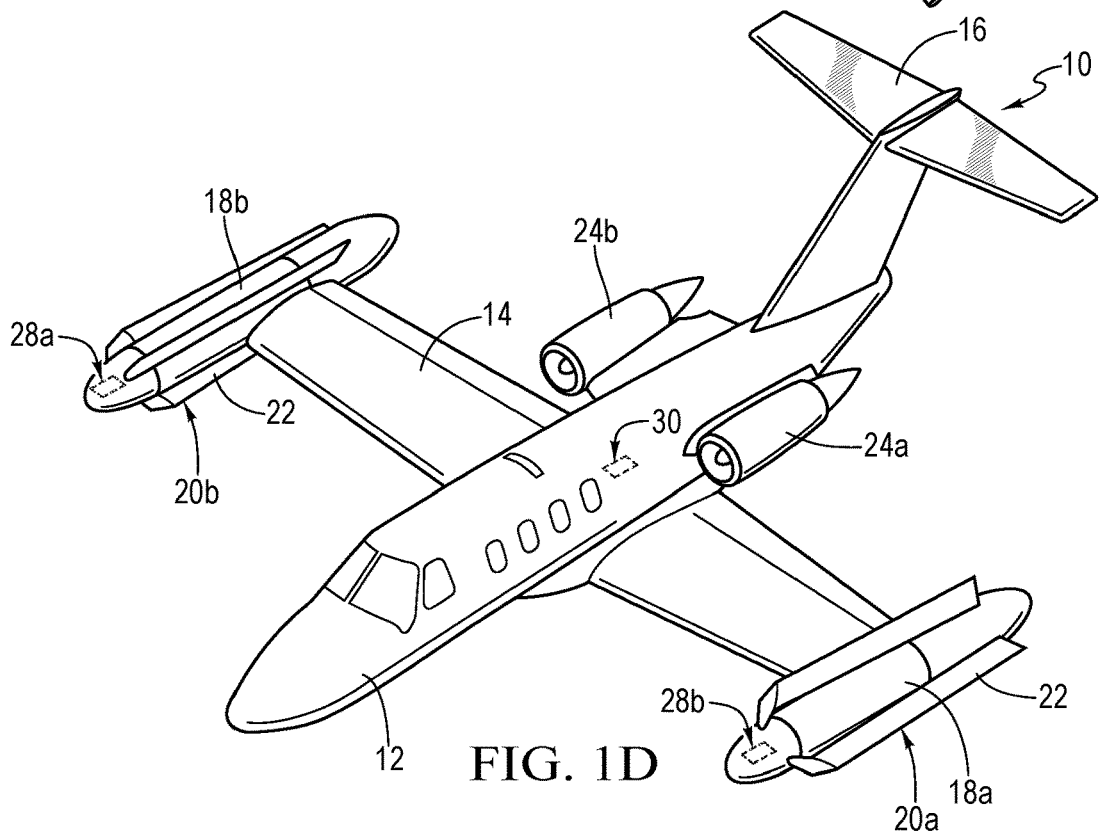

Referring to FIGS. 1A-1D in the drawings, a tiltrotor aircraft is schematically illustrated and generally designated 10. Aircraft 10 includes a fuselage 12, a wing 14 and a tail assembly 16 including control surfaces operable for horizontal and/or vertical stabilization during forward flight. Located proximate the outboard ends of wing 14 are pylon assemblies 18a, 18b that are rotatable relative to wing 14 between a generally vertical orientation, as best seen in FIG. 1A, and a generally horizontal orientation, as best seen in FIGS. 1B-1D. Pylon assemblies 18a, 18b each house a portion of the drive system that is used to rotate proprotor assemblies 20a, 20b, respectively. Each proprotor assembly 20a, 20b includes a plurality of proprotor blades 22 that are operable to be rotated, as best seen in FIGS. 1A-1B, operable to be feathered, as best seen in FIG. 1C and operable to be folded, as best seen in FIG. 1D. In the illustrated embodiment, proprotor assembly 20a is rotated responsive to torque and rotational energy provided by engine 24a and proprotor assembly 20b is rotated responsive to torque and rotational energy provided by engine 24b. Engines 24a, 24b are located proximate an aft portion of fuselage 12. Engines 24a, 24b are operable in a turboshaft mode, as best seen in FIGS. 1A-1B and a turbofan mode, as best seen in FIGS. 1C-1D.

FIG. 1A illustrates aircraft 10 in VTOL or helicopter flight mode, in which proprotor assemblies 20a, 20b are rotating in a substantially horizontal plane to provide a lifting thrust, such that aircraft 10 flies much like a conventional helicopter. In this configuration, engines 24a, 24b are operable in turboshaft mode wherein hot combustion gases in each engine 24a, 24b cause rotation of a power turbine coupled to an output shaft that is used to power the drive system coupled to the respective proprotor assemblies 20a, 20b.

Thus, in this configuration, aircraft 10 is considered to be in a rotary flight mode. FIG. 1B illustrates aircraft 10 in proprotor forward flight mode, in which proprotor assemblies 20a, 20b are rotating in a substantially vertical plane to provide a forward thrust enabling wing 14 to provide a lifting force responsive to forward airspeed, such that aircraft 10 flies much like a conventional propeller driven aircraft. In this configuration, engines 24a, 24b are operable in the turboshaft mode and aircraft 10 is considered to be in the rotary flight mode.

In the rotary flight mode of aircraft 10, proprotor assemblies 20a, 20b rotate in opposite directions to provide torque balancing to aircraft 10. For example, when viewed from the front of aircraft 10 in proprotor forward flight mode (FIG. 1B) or from the top in helicopter mode (FIG. 1A), proprotor assembly 20a rotates clockwise, as indicated by motion arrows 26a, and proprotor assembly 20b rotates counterclockwise, as indicated by motion arrows 26b. In the illustrated embodiment, proprotor assemblies 20a, 20b each include three proprotor blades 22 that are equally spaced apart circumferentially at approximately 120 degree intervals. It should be understood by those having ordinary skill in the art, however, that the proprotor assemblies of the present disclosure could have proprotor blades with other designs and other configurations including proprotor assemblies having four, five or more proprotor blades. In addition, it should be appreciated that aircraft 10 can be operated such that proprotor assemblies 20a, 20b are selectively positioned between proprotor forward flight mode and helicopter mode, which can be referred to as a conversion flight mode.

A flight control computer 30 is schematically shown in fuselage 12, but it should be appreciated that the flight control computer 30 may take a number of forms and exist in a variety of locations within aircraft 10. Similarly, although flight control computer 30 is illustrated singly, flight control computer 30 can be illustrative of two, three, four or any other suitable number of flight control computers in aircraft 10, which computers can be located in same, similar or different locations within fuselage 12 or elsewhere in aircraft 10.

Flight control computer 30 is configured to control and communicate with various systems within aircraft 10 including, for example, local control systems 28a and 28b. Local control systems 28a and 28b are schematically shown in the proprotor assemblies 20a and 20b, respectively. The local control systems 28a and 28b can each be communicably coupled to the flight control computer 30 and provide closed-loop control of controllable elements located within the proprotor assemblies 20a and 20b. The controllable elements within the proprotor assemblies 20a and 20b can include any structural feature operable to move and/or effect change such as, for example, blade locks, a gimbal lock, trailing-edge flaps, twistable blades, independently controllable elements attached or connected to blades, combinations of the foregoing and/or the like.

The local control systems 28a and 28b can include, inter alia, actuators that control motion of the controllable elements in the proprotor assemblies 20a and 20b, sensors that provide feedback data related to the controllable elements and control computers that operate the actuators, for example, by transmitting control signals to the actuators. As will be illustrated in greater detail with respect to FIGS. 4-6, the flight control computer 30 and the local control systems 28a and 28b can collaboratively provide a variety of redundant control methods relative to the controllable elements in the proprotor assemblies 20a and 20b.

FIG. 1C illustrates aircraft 10 in transition between proprotor forward flight mode and airplane forward flight mode, in which engines 24a, 24b have been disengaged from proprotor assemblies 20a, 20b and proprotor blades 22 of proprotor assemblies 20a, 20b have been feathered, or oriented to be streamlined in the direction of flight, such that proprotor blades 22 act as brakes to aerodynamically stop the rotation of proprotor assemblies 20a, 20b. In this configuration, engines 24a, 24b are operable in turbofan mode wherein hot combustion gases in each engine 24a, 24b cause rotation of a power turbine coupled to an output shaft that is used to power a turbofan that forces bypass air through a fan duct to create forward thrust enabling wing 14 to provide a lifting force responsive to forward airspeed, such that aircraft 10 flies much like a conventional jet aircraft. Thus, in this configuration, aircraft 10 is considered to be in a non-rotary flight mode. FIG. 1D illustrates aircraft 10 in airplane forward flight mode, in which proprotor blades 22 of proprotor assemblies 20a, 20b have been folded to be oriented substantially parallel to respective pylon assemblies 18a, 18b to minimize the drag force generated by proprotor blades 22. In this configuration, engines 24a, 24b are operable in the turbofan mode and aircraft 10 is considered to be in the non-rotary flight mode. The forward cruising speed of aircraft 10 can be significantly higher in airplane forward flight mode versus proprotor forward flight mode as the forward airspeed induced proprotor aeroelastic instability is overcome.

Even though aircraft 10 has been described as having two engines fixed to the fuselage each operating one of the proprotor assemblies in the rotary flight mode, it should be understood by those having ordinary skill in the art that other engine arrangements are possible and are considered to be within the scope of the present disclosure including, for example, having a single engine that provides torque and rotational energy to both of the proprotor assemblies. In addition, even though proprotor assemblies 20a, 20b are illustrated in the context of tiltrotor aircraft 10, it should be understood by those having ordinary skill in the art that the proprotor assemblies disclosed herein can be implemented on other tiltrotor aircraft including, for example, quad tiltrotor aircraft having an additional wing member aft of wing 14, unmanned tiltrotor aircraft or other tiltrotor aircraft configurations.

Referring to FIGS. 2A-2G of the drawings, a mechanism for transitioning a tiltrotor aircraft between rotary and non-rotary flight modes is depicted and generally designated 100. In the illustrated embodiment, a rotor assembly 102 is depicted as a gimbal mounted, three bladed rotor assembly having a gimballing degree of freedom relative to a mast 104. Rotor assembly 102 includes a rotor hub 106 that is coupled to and operable to rotate with mast 104. Rotor hub 106 has a conical receptacle 108 extending from a lower portion thereof. Rotor hub 106 includes three arms 110 each of which support a rotor blade assembly 112, only one being visible in the figures. Each rotor blade assembly 112 includes a cuff 114 and a rotor blade 116 that is pivotably coupled to cuff 114 by a connection member depicted as pin 118. As discussed herein, rotor blade assembly 112 has a pitching degree of freedom during rotary flight and a folding degree of freedom during non-rotary flight.

The pitching and folding degrees of freedom of rotor blade assembly 112 are realized using the highly reliable operation of swash plate 120. Swash plate 120 includes a non-rotating lower swash plate element 122 and a rotating upper swash plate element 124. Swash plate element 124 is operably coupled to each rotor blade assembly 112 at cuff 114 via a pitch link 126 and a pitch horn 128, only one such connection being visible in the figures. A control system including swash plate actuators (not pictured) is coupled to swash plate element 122. The control system operates responsive to pilot input to raise, lower and tilt swash plate element 122 and thus swash plate element 124 relative to mast 104. These movements of swash plate 120 collectively and cyclically control the pitch of rotor blade assemblies 112 during rotary flight and fold rotor blade assemblies 112 during non-rotary flight.

Figure 2A:
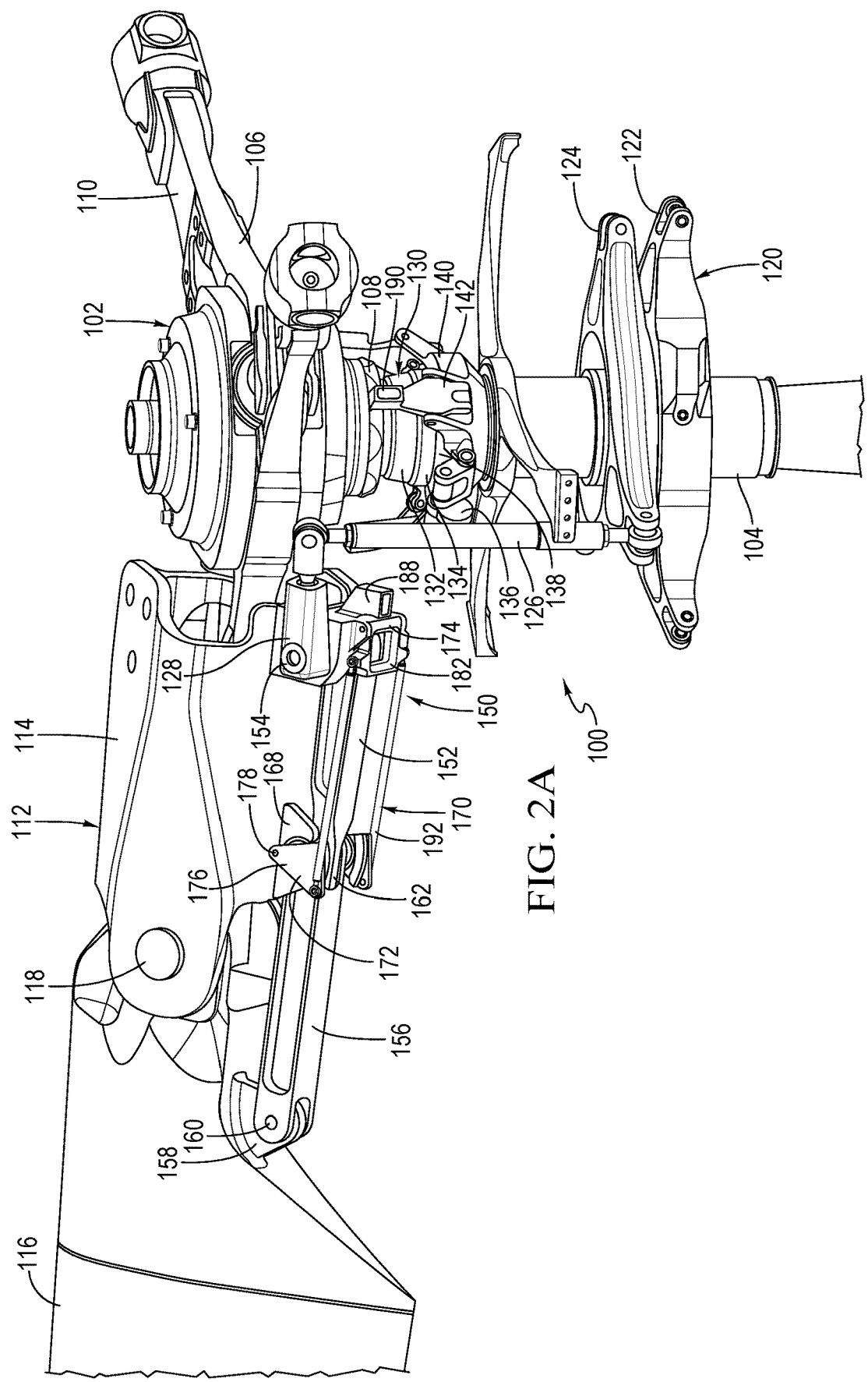
FIGS. 2A-2G are isometric views of a mechanism for transitioning a tiltrotor aircraft between rotary and non-rotary flight modes, in various positions, in accordance with embodiments of the present disclosure.
Figure 2B:
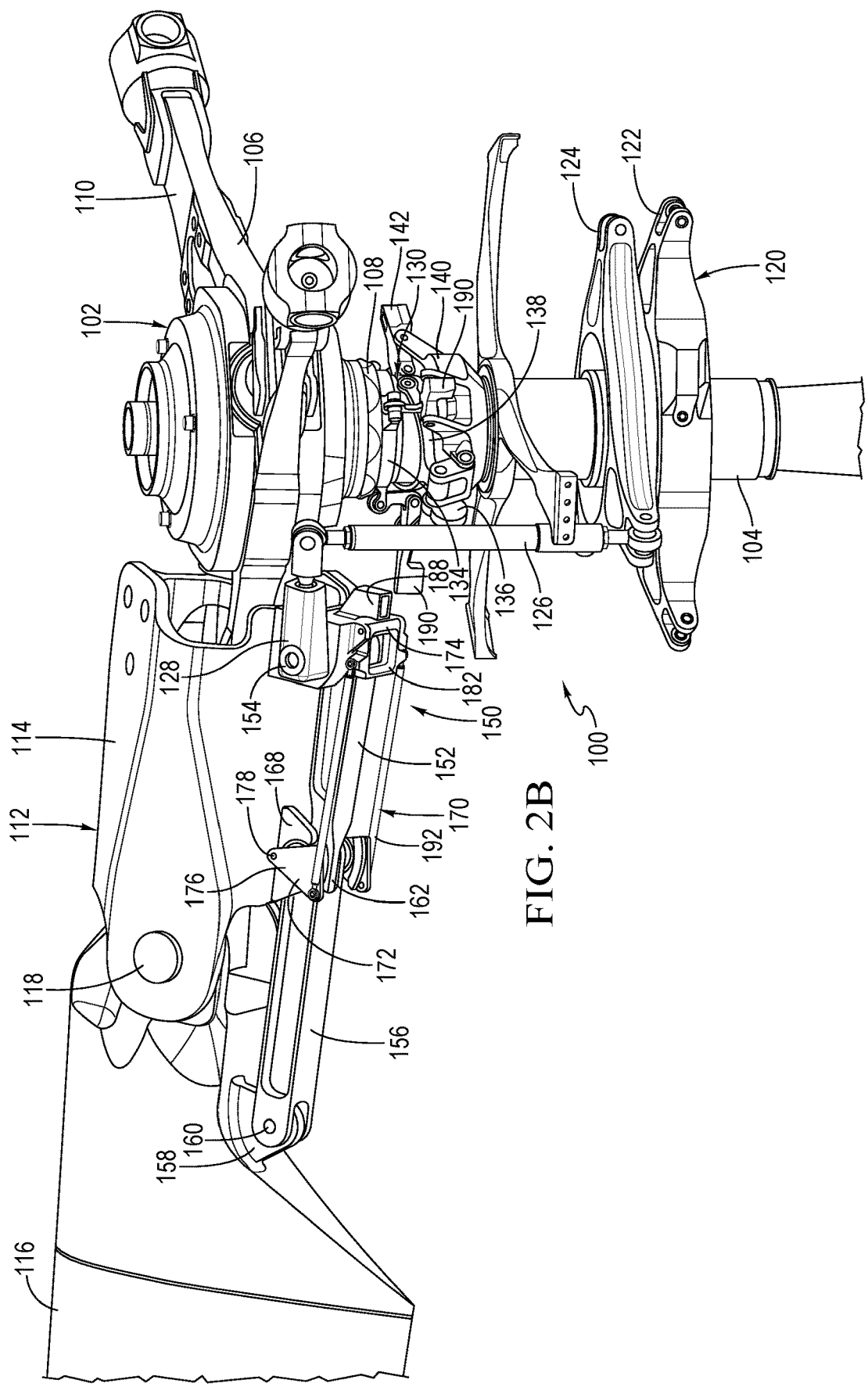

Transitioning mechanism 100 includes a gimbal lock 130 that is coupled to and operable to rotate with mast 104. Gimbal lock 130 includes a conical ring 132, an actuation ring 134 and an actuator 136 including a lift ring 138. Gimbal lock 130 is operable to selectively enable and disable the gimballing degree of freedom of rotor assembly 102 relative to mast 104. As best seen in FIG. 2A, gimbal lock 130 is disengaged from rotor assembly 102, which enables the gimballing degree of freedom of rotor assembly 102. In this configuration, there is an axial separation between conical ring 132 of gimbal lock 130 and conical receptacle 108 of rotor hub 106 such that any teetering or flapping motion of rotor assembly 102 is not impacted by gimbal lock 130. When it is desired to transition the tiltrotor aircraft from the rotary flight mode and the non-rotary flight mode, actuator 136 is operated to cause lift ring 138 to raise actuation ring 134, which in turn raises conical ring 132 into conical receptacle 108 of rotor hub 106. In this configuration, as best seen in FIG. 2B, gimbal lock 130 is engaged with rotor assembly 102, which disables the gimballing degree of freedom of rotor assembly 102 relative to mast 104 for non-rotary flight. In the illustrated embodiment, conical ring 132 has a conical geometry that is configured to mate with a similar geometry of receptacle 108 thus disabling the gimballing degree of freedom of rotor assembly 102 relative to mast 104. It should be appreciated, however, that the exact mating geometry of conical ring 132 and receptacle 108 is implementation specific and not limited to the illustrated geometry.

Figure 2C:
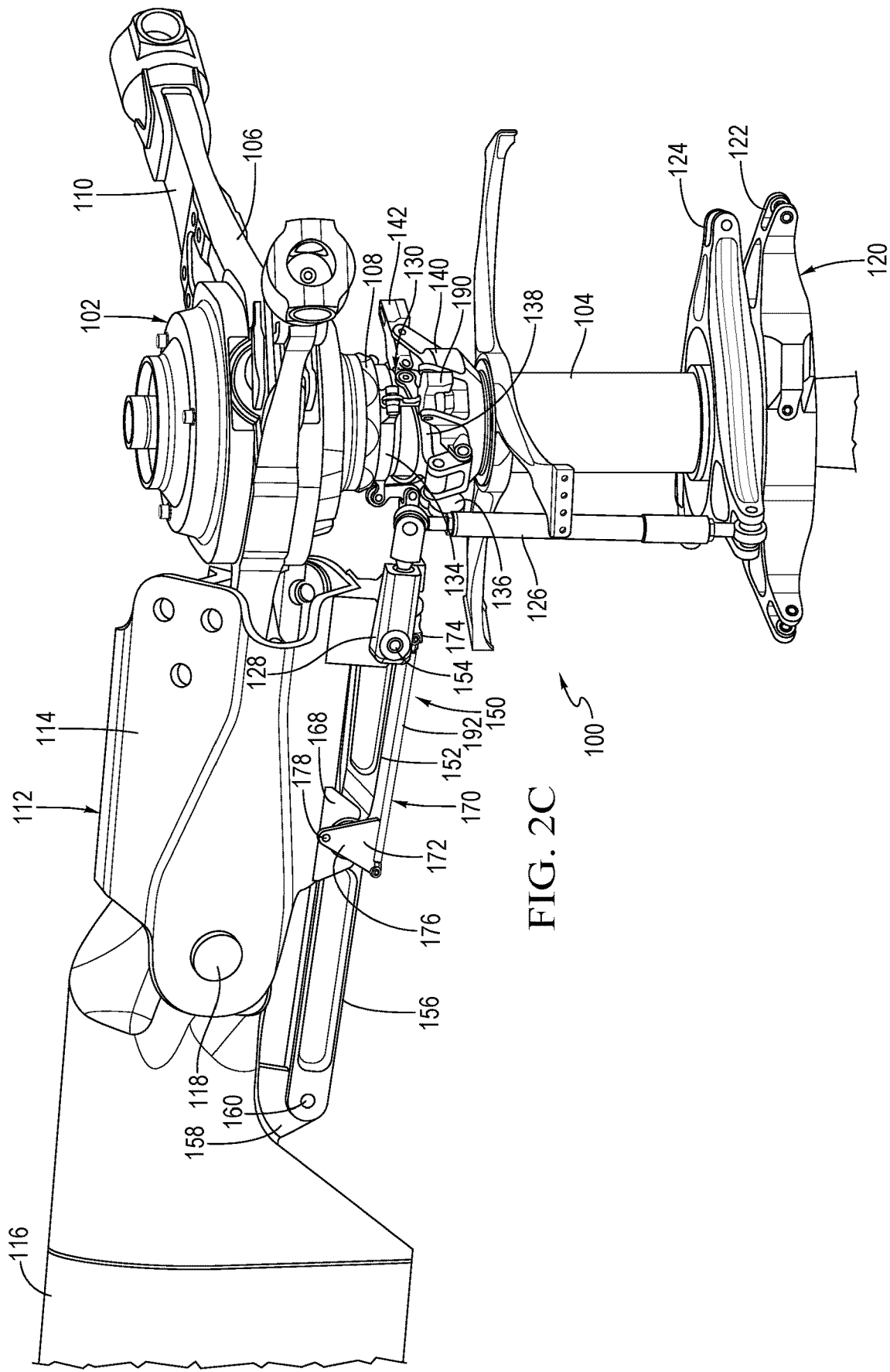

Transitioning mechanism 100 also includes a blade stop assembly 140 that is coupled to and operable to rotate with mast 104. Blade stop assembly 140 includes three arms 142 that correspond to the three rotor blade assemblies 112 of rotor assembly 102. In the illustrated embodiment, blade stop assembly 140 is integrated with gimbal lock 130 and shares actuation ring 134, actuator 136 and lift ring 138 therewith, such that operation of blade stop assembly 140 occurs together with the operation of gimbal lock 130. It should be appreciated, however, that a blade stop assembly and a gimbal lock for use with the embodiments disclosed herein could alternatively operate independent of one another. As best seen in FIG. 2A, arms 142 of blade stop assembly 140 have a radially contracted orientation, which provides clearance for rotor blade assemblies 112 during rotary flight. When it is desired to transition the tiltrotor aircraft from the rotary flight mode and the non-rotary flight mode, actuator 136 is operated to cause lift ring 138 to raise actuation ring 134, which in turn shifts arms 142 from the radially contracted orientation to a radially extended orientation, as best seen in FIG. 2B. In this configuration, arms 142 of blade stop assembly 140 will each engage a cuff 114 of a rotor blade assembly 112 upon feathering the rotor blade assemblies 112 responsive to lowering swash plate 120, as best seen in FIG. 2C. In this manner, blade stop assembly 140 provides a positive stop for rotor blade assemblies 112.

Referring additionally to FIGS. 3A-3E, transitioning mechanism 100 includes three blade lock assemblies 150, only one being visible in the figures. Each blade lock assembly 150 is selectively operable to enable and disable the folding degree of freedom and the pitching degree of freedom of the respective rotor blade assembly 112. As illustrated, each blade lock assembly 150 includes a crank 152 that is rotatably coupled to cuff 114 and rotatable with pitch horn 128 via a connection member depicted as pin 154. In this manner, rotation of crank 152 is responsive to the rise and fall of swash plate 120 in non-rotary flight. Each blade lock assembly 150 also includes a link 156 that is rotatably coupled to rotor blade 116 at lug 158 via a connection member depicted as pin 160. Crank 152 and link 156 are coupled together at a pivot joint 162. In the illustrated embodiment, coincident with pivot joint 162, link 156 includes a pair of outwardly extending flanges 164 each having a roller element 166 rotatably coupled thereto. Each flange 164 is receivable in a seat 168 of cuff 114 when it is desired to disable the folding degree of freedom of rotor blade assembly 112. Preferably, an arch shaped geometry of the contact surface of each seat 168 is sized such that a fully engaged flange 164 seated therein will have two points of contact therewith providing a stiff connection, thereby minimizing any vibrations and/or relative movement between the parts.

Figure 3A:
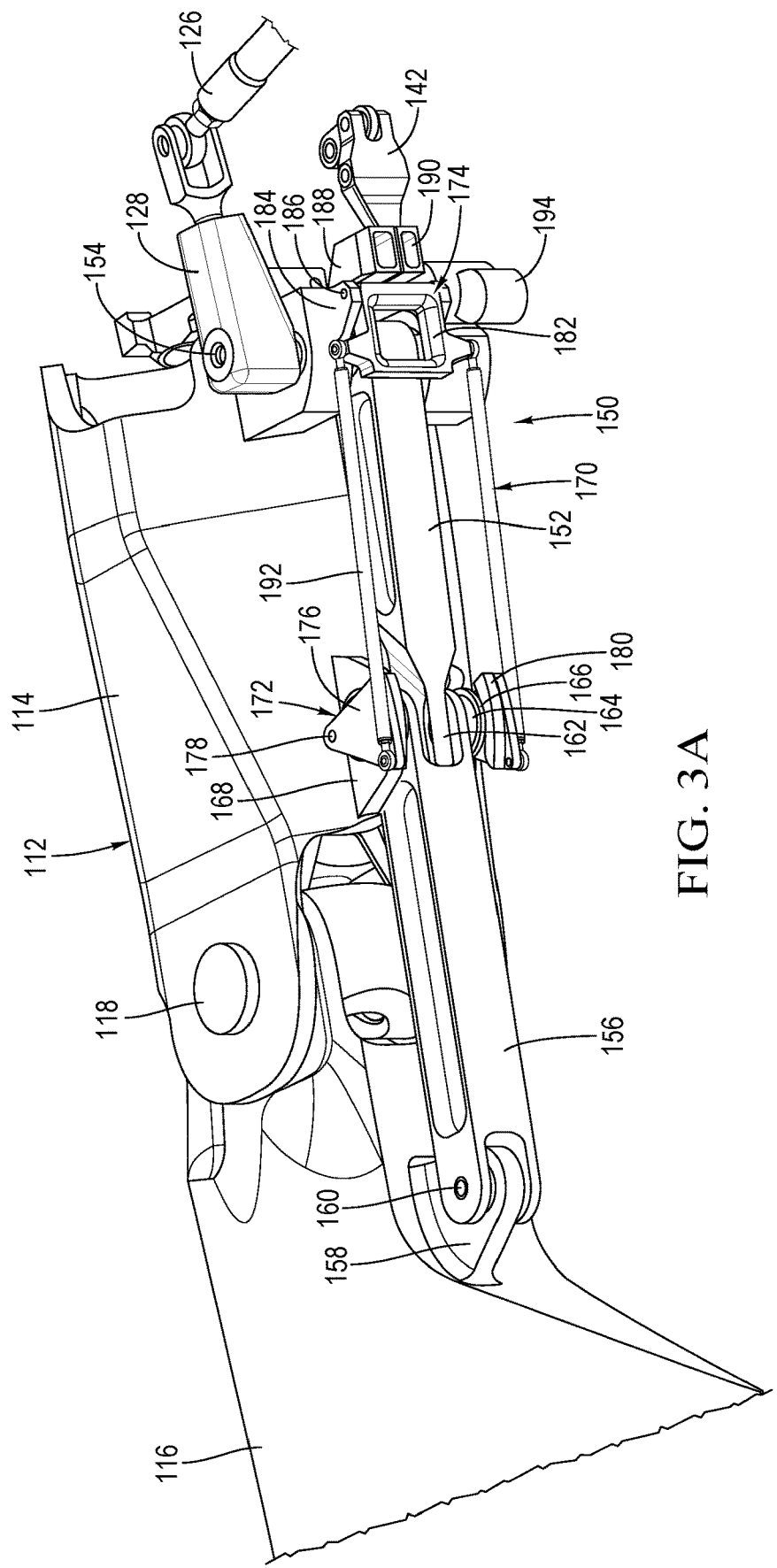
FIGS. 3A-3E are isometric views of a blade lock assembly of a mechanism for transitioning a tiltrotor aircraft between rotary and non-rotary flight modes, in various positions, in accordance with embodiments of the present disclosure.
Figure 3B:
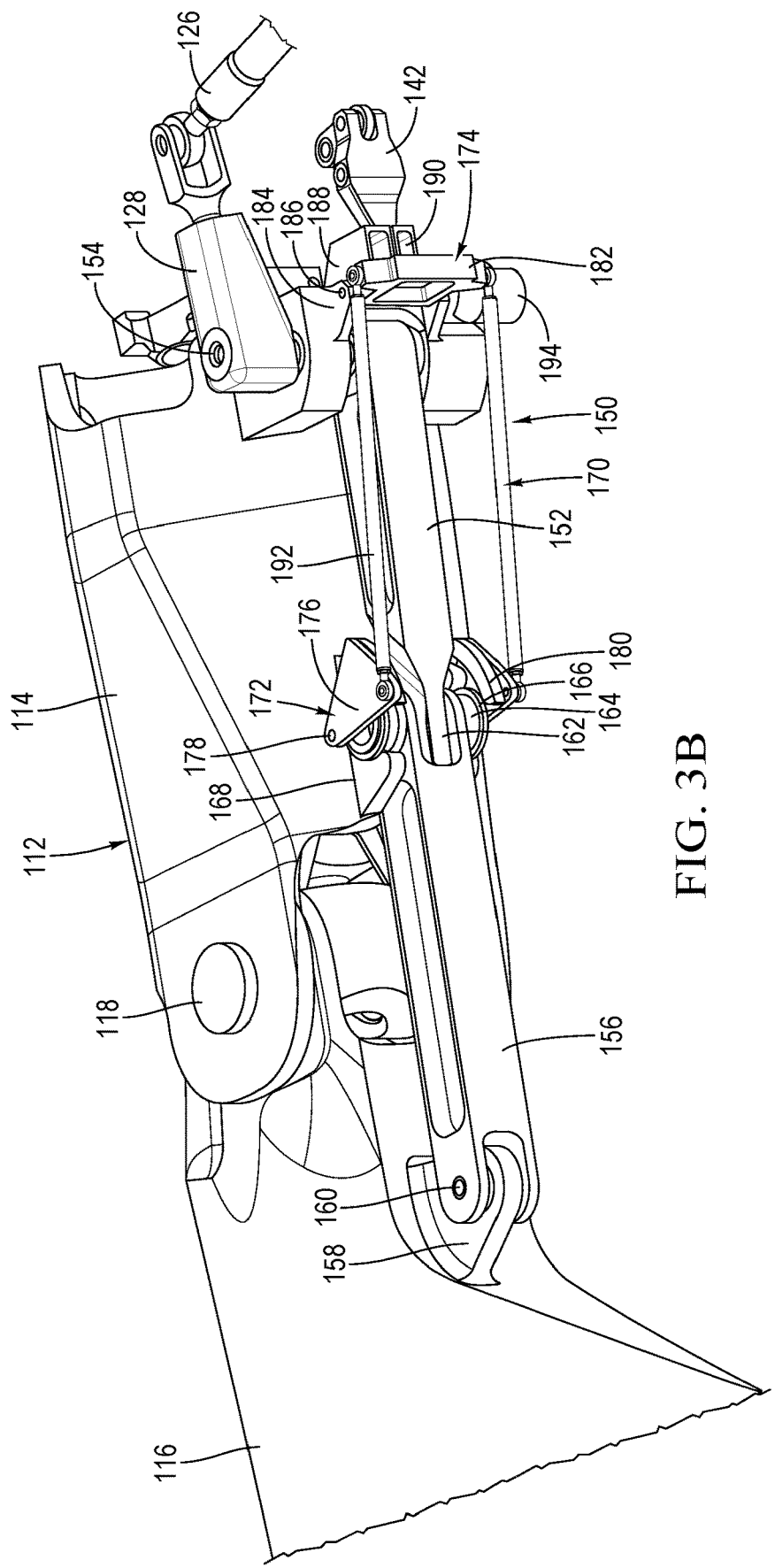
Figure 3C:
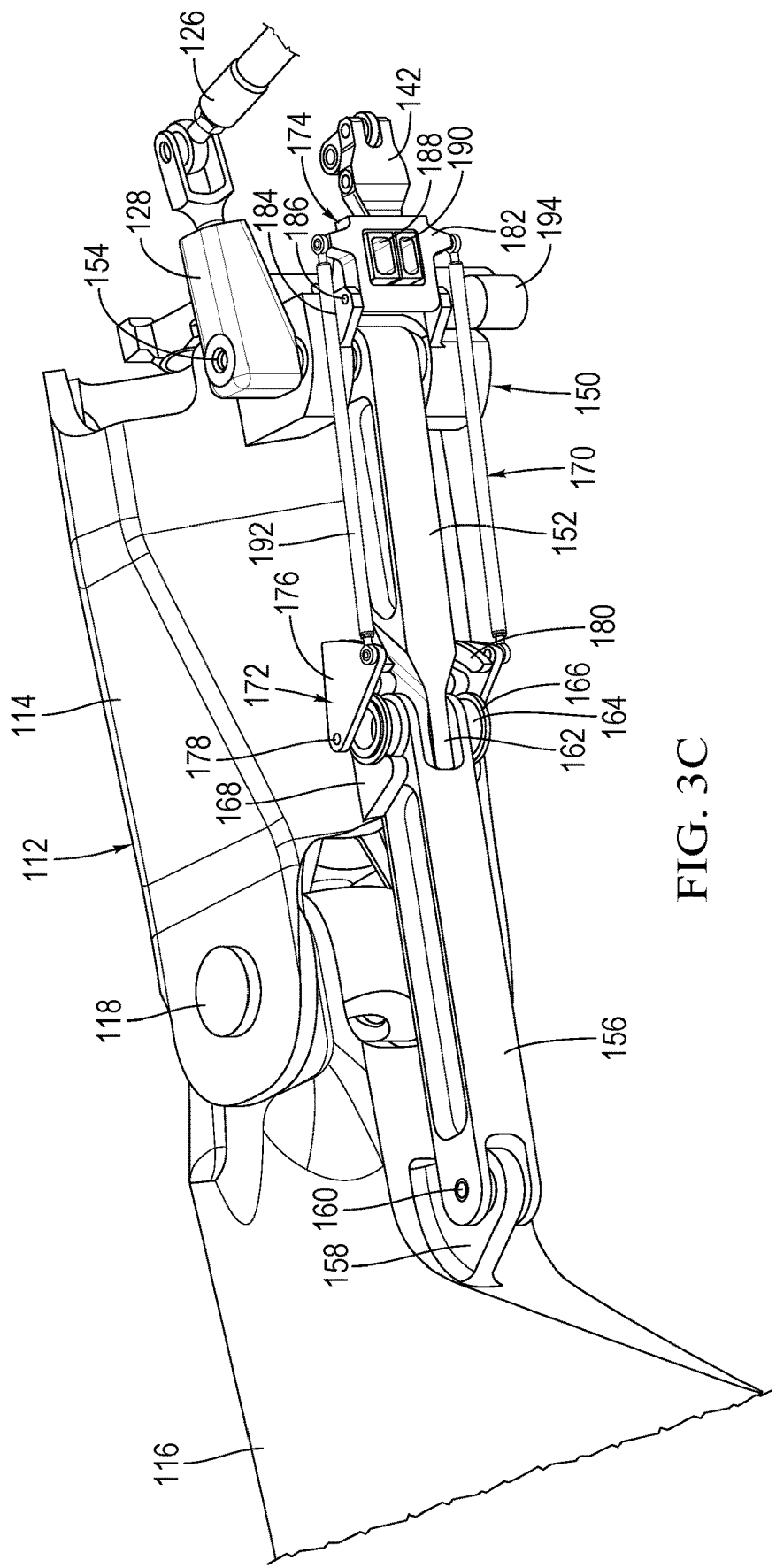

Each blade lock assembly 150 further includes a blade lock 170 having a fold lock position securing pivot joint 162 to cuff 114 and a pitch lock position securing cuff 114 to arm 142 of blade stop assembly 140. More specifically, each blade lock 170 includes a fold lock 172 and a pitch lock 174. Each fold lock 172 consists of a pair of arms 176 that are rotatably coupled to respective seats 168 of cuff 114 via connection members depicted as pins 178. Each arm 176 includes a wedge 180 having a bearing surface that contacts a respective roller element 166 and provides maximum contact force when fold lock 172 is fully engaged, as best seen in FIG. 3A. Each pitch lock 174 includes a hasp 182 that is rotatably coupled to a pair of lugs 184 of cuff 114 via a connection member depicted as pin 186. Each hasp 182 includes a central opening operable to selectively receive and retain a tab 188 of cuff 114 and a tab 190 of arm 142 therein, as best seen in FIG. 3C. In the illustrated embodiment, fold lock 172 and a pitch lock 174 are coupled together by a pair of adjustable connecting rods 192 such that a single actuator 194 is operable to shift blade lock 170 between the fold lock position, depicted in FIG. 3A, and the pitch lock position, depicted in FIG. 3B. It should be appreciated, however, that a fold lock and a pitch lock for use with the embodiments disclosed herein could alternatively operate independent of one another.

The operation of transitioning mechanism 100 will now be described with reference to an exemplary flight of tiltrotor aircraft 10. For vertical takeoff and hovering in helicopter flight mode, as best seen in FIG. 1A, and low speed forward flight in proprotor forward flight mode, as best seen in FIG. 1B, tiltrotor aircraft 10 is in rotary flight mode. To achieve this operational mode, engines 24a, 24b are in turboshaft mode to provide torque and rotational energy to proprotor assemblies 20a, 20b, gimbal lock 130 is in the disengaged position enabling the gimballing degree of freedom of rotor assemblies 102, as best seen in FIG. 2A, arms 142 of blade stop assembly 140 are in the radially contracted orientation providing clearance for rotor assemblies 102, as best seen in FIG. 2A, and each of the blade lock assemblies 150 is enabling the pitching degree of freedom and disabling the folding degree of freedom of rotor blade assemblies 112, as best seen in FIG. 3A. In this configuration, swash plate 120 collectively and cyclically controls the pitch of rotor blade assemblies 112 responsive to pilot input.

When it is desired to transition tiltrotor aircraft 10 from low speed forward flight in proprotor forward flight mode, as best seen in FIG. 1B, to high speed forward flight in airplane forward flight mode, as best seen in FIG. 1D, transitioning mechanism 100 is used to safely achieve this result. As a preliminary step, engines 24a, 24b are transitioned from turboshaft mode to turbofan mode until forward thrust is solely generated by engines 24a, 24b and tiltrotor aircraft 10 is in non-rotary flight mode. Swash plate 120 is now used to collectively shift the pitch of rotor blade assemblies 112 to the feathering position, as best seen in FIG. 1C, wherein rotor blades 116 act as brakes to aerodynamically stop the rotation of rotor assemblies 102. To disable the gimballing degree of freedom of rotor assembly 102, actuator 136 is operated to cause lift ring 138 to raise actuation ring 134, which in turn raises conical ring 132 into conical receptacle 108 of rotor hub 106, as best seen in FIG. 2B. At the same time, responsive to lift ring 138 raising actuation ring 134, arms 142 shift from the radially contracted orientation to the radially extended orientation, as best seen in FIG. 2B, to provide a positive stop for rotor blade assemblies 112.

Next, actuators 194 are operated to shift blade locks 170 from the fold lock position, depicted in FIG. 3A, to the pitch lock position, depicted in FIG. 3C. Actuator 194 simultaneously causes hasp 182 to rotate relative to lugs 184 of cuff 114 about pin 186 and arms 176 to rotate relative to seats 168 of cuff 114 about pins 178, as best seen in FIG. 3B. At the end of travel, hasp 182 has received tab 188 of cuff 114 and tab 190 of arm 142 in a central opening, as best seen in FIG. 3C, which disables the pitching degree of freedom of rotor blade assemblies 112. Also, at the end of travel, wedges 180 have cleared the lower portion of seats 168, which enables the folding degree of freedom of rotor blade assemblies 112. Swash plate 120 is now used to collectively shift rotor blade assemblies 112 from the radially outwardly extending feathering position, as best seen in FIG. 1C, to a folded orientation, as best seen in FIGS. 1D and 2G.

Figure 2F:
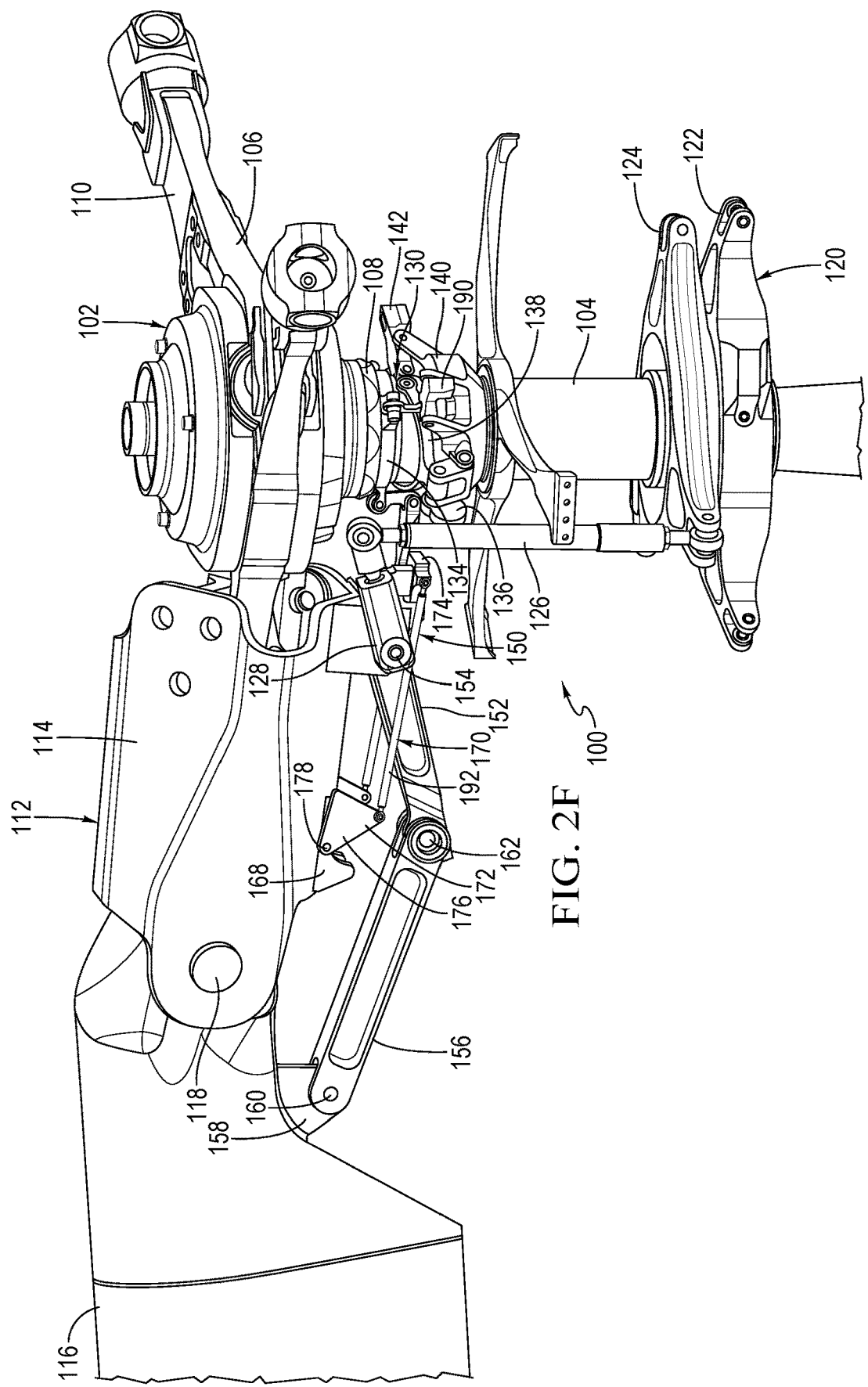
Figure 2G:
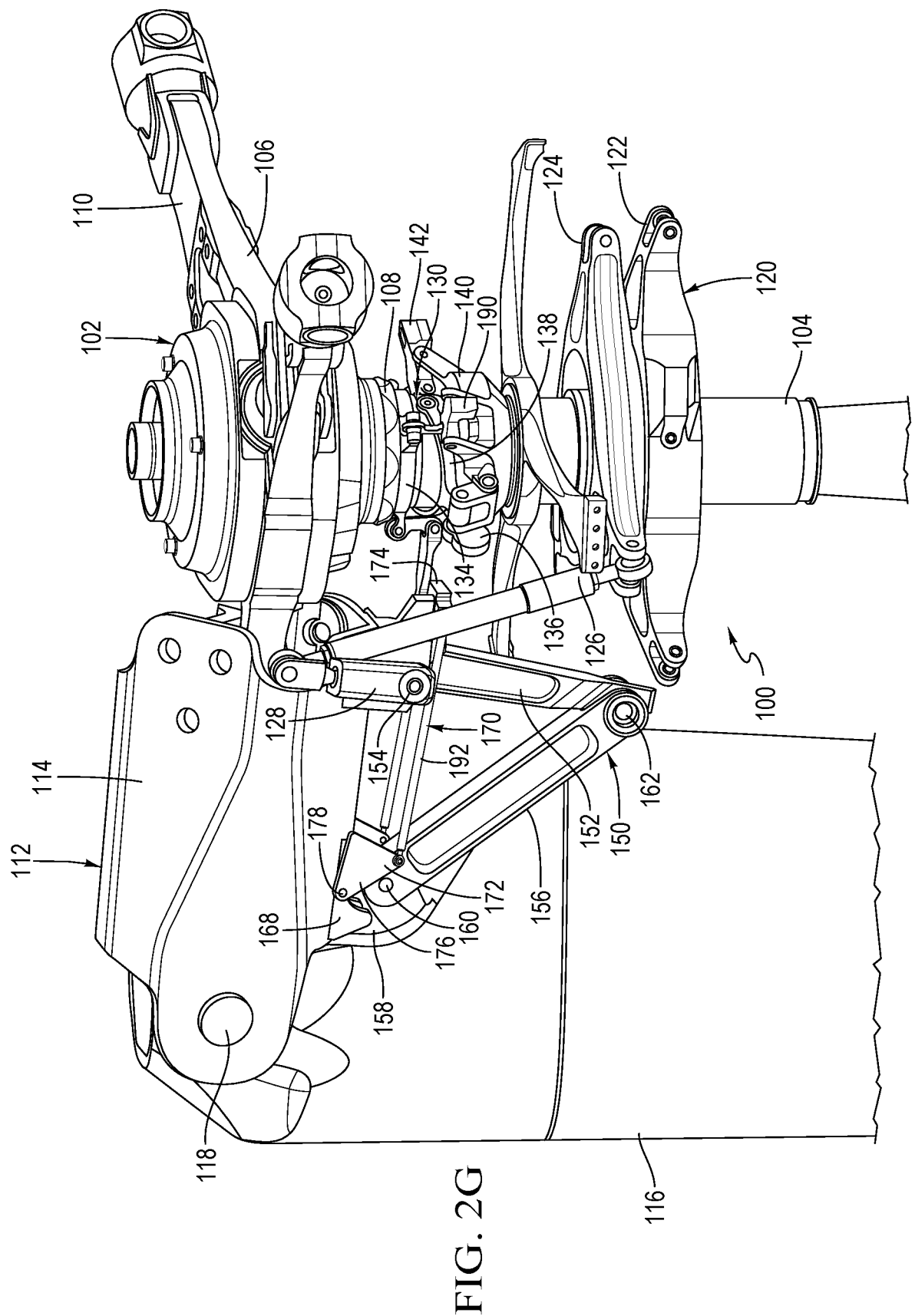
Figure 3D:
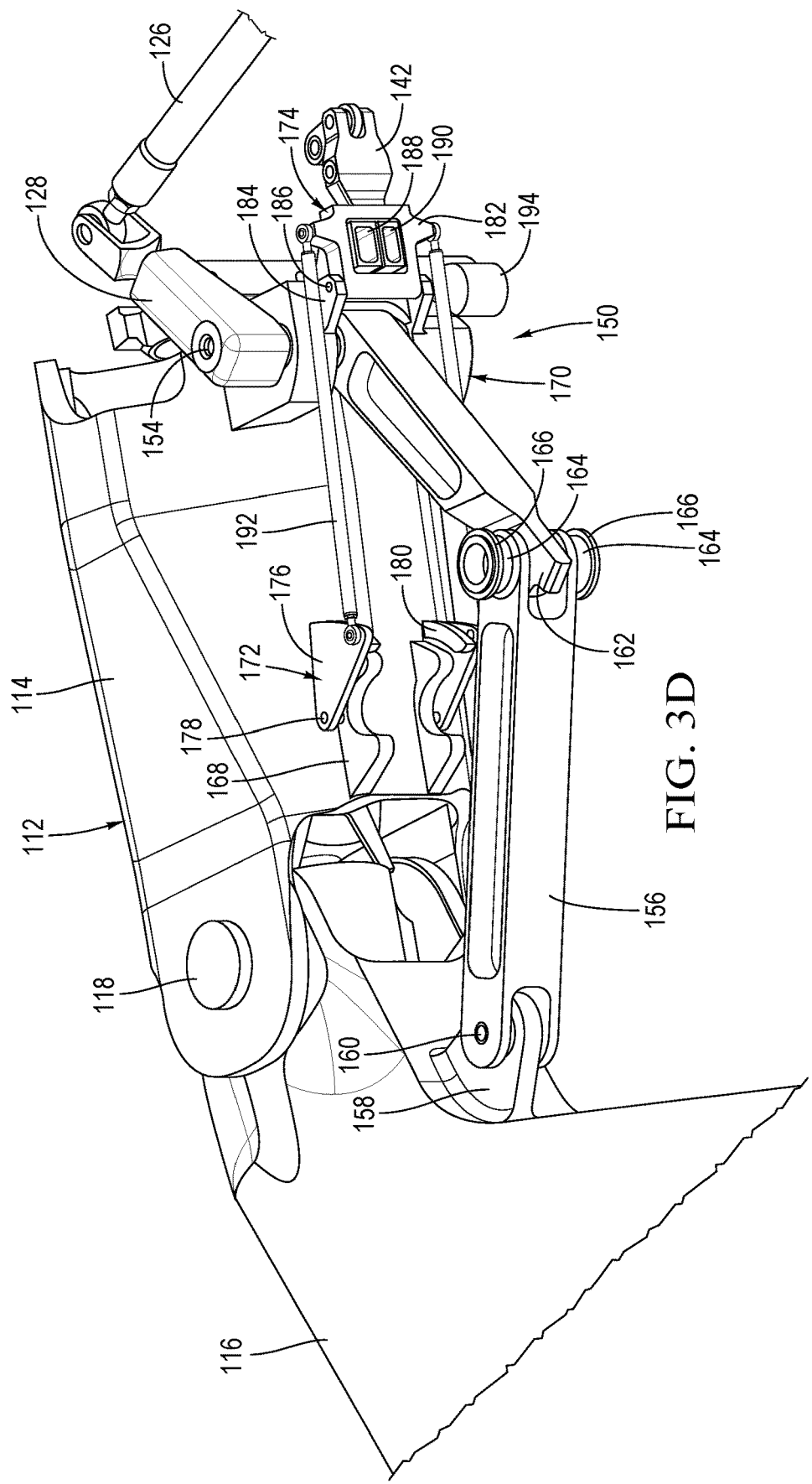
Figure 3E:
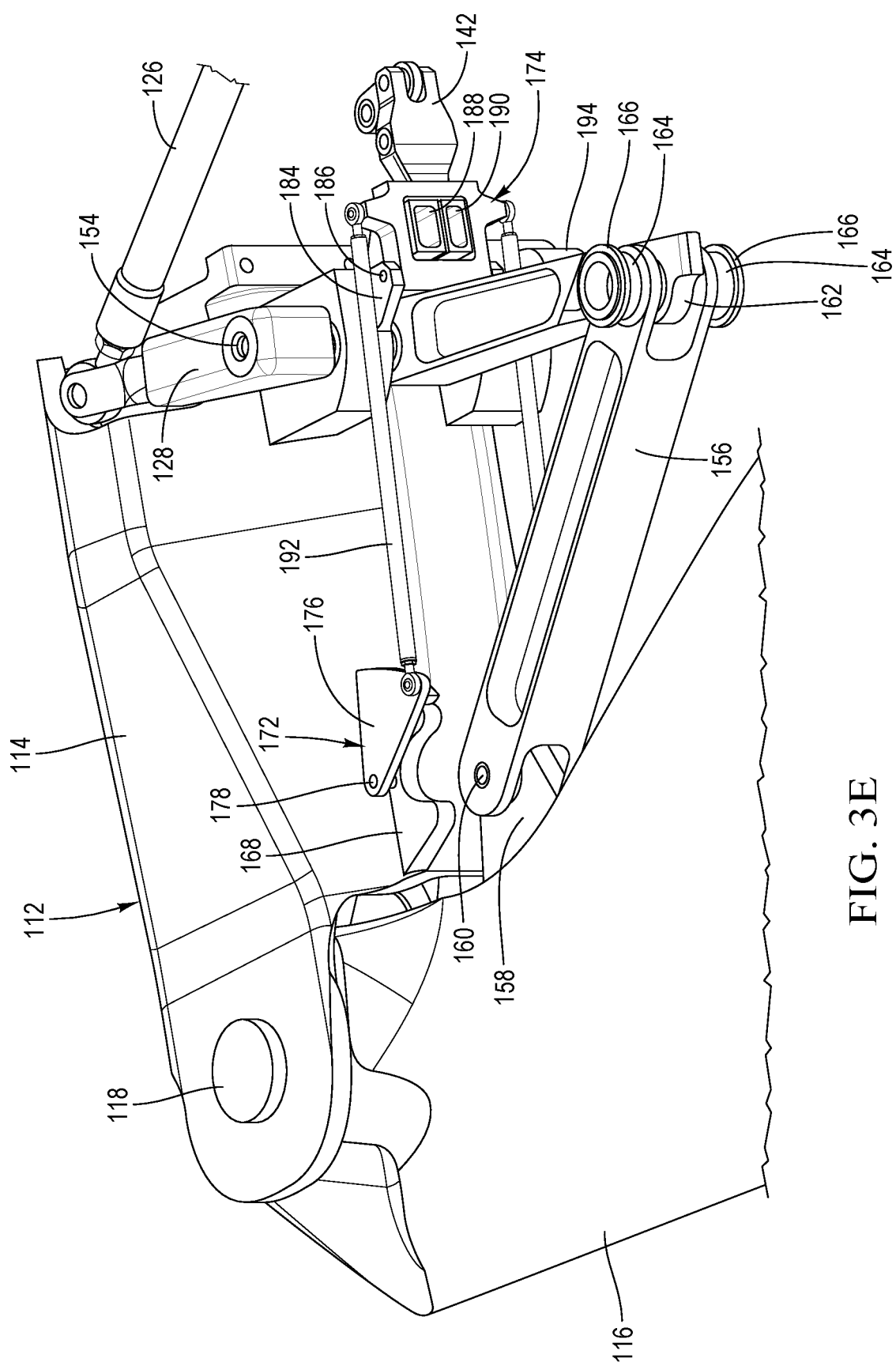

With the pitching degree of freedom disabled, rise and fall of swash plate 120 now rotates pitch horn 128 relative to cuff 114, which in turn causes rotation of crank 152. The rotation of crank 152 causes rotation of link 156 relative to lug 158 about pin 160, rotation in pivot joint 162, which disengages flanges 164 from seats 168, and rotation of rotor blade 116 relative to cuff 114 about pin 118, as best seen in FIGS. 2F and 3D. Continued operation of swash plate 120 causes continued rotation of pitch horn 128, crank 152, link 156 and rotor blade 116 until rotor blade 116 reaches its desired folded orientation, as best seen in FIGS. 2G and 3E. Tiltrotor aircraft 10 is now in airplane flight mode, which is the high speed forward flight mode of tiltrotor aircraft 10 and is a non-rotary flight mode. In this operational mode, engines 24a, 24b are in turbofan mode providing no torque and rotational energy to proprotor assemblies 20a, 20b, gimbal lock 130 is in the engaged position disabling the gimballing degree of freedom of rotor assemblies 102, arms 142 of blade stop assembly 140 are in the radially extended orientation providing a position stop and coupling for rotor blade assemblies 112, and each of the blade lock assemblies 150 is disabling the pitching degree of freedom and enabling the folding degree of freedom of rotor blade assemblies 112.

When it is desired to transition back to proprotor forward flight mode, as best seen in FIG. 1B, from airplane forward flight mode, as best seen in FIG. 1D, transitioning mechanism 100 is used to safely achieve this result. With the pitching degree of freedom disabled, lowering swash plate 120 rotates pitch horn 128 relative to cuff 114, which in turn causes rotation of crank 152, link 156 and the unfolding of rotor blade 116, as best seen in FIGS. 2F and 3D. Continued operation of swash plate 120 causes continued rotation of pitch horn 128, crank 152, link 156 and rotor blade 116 until rotor blade 116 reaches its desired radially outwardly extending orientation, as best seen in FIG. 2E. In this position, crank 152 and link 156 are generally aligned such that flanges 164 have entered seats 168, as best seen in FIG. 3C.

Figure 2D:
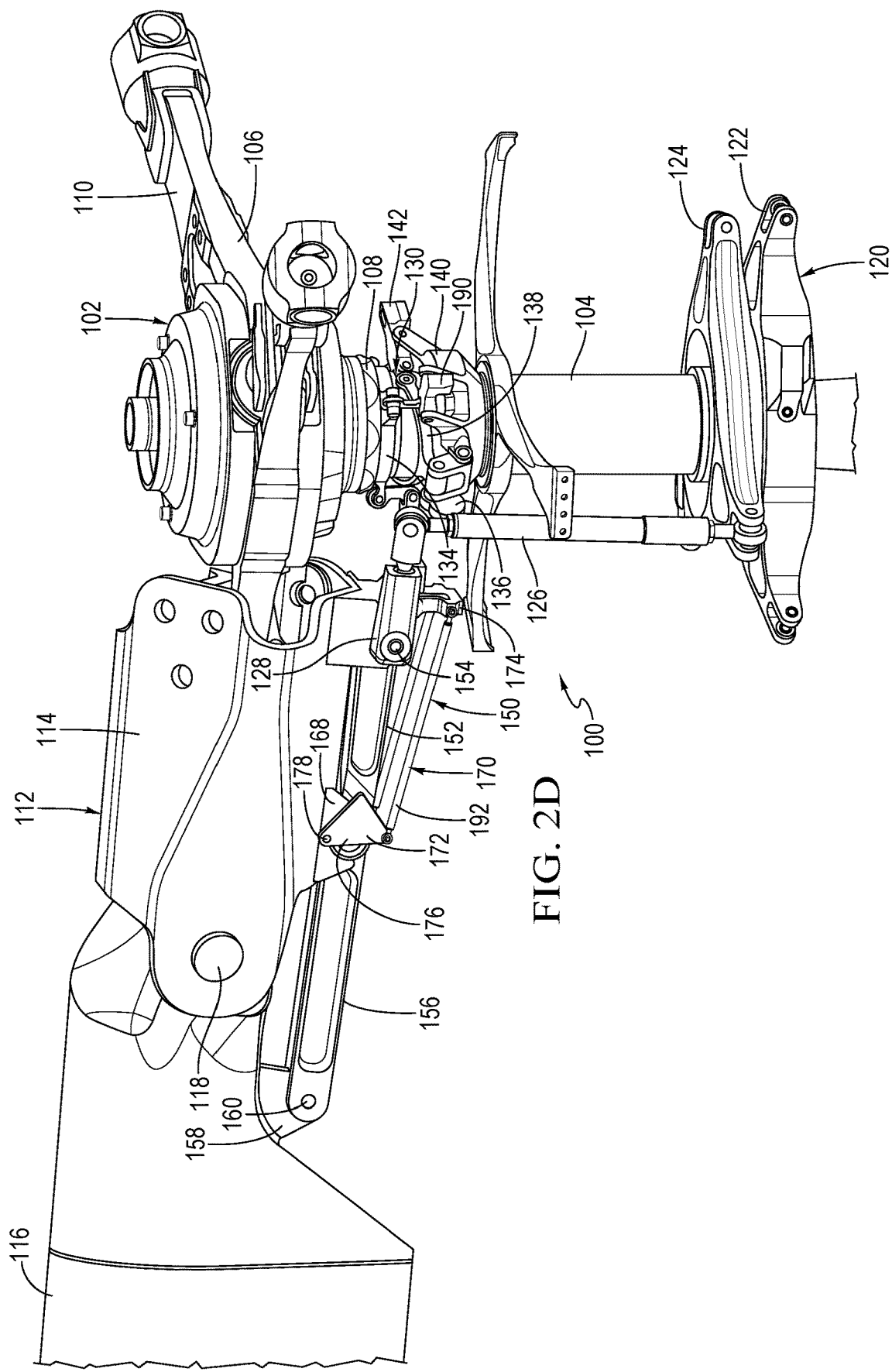
Figure 2E:
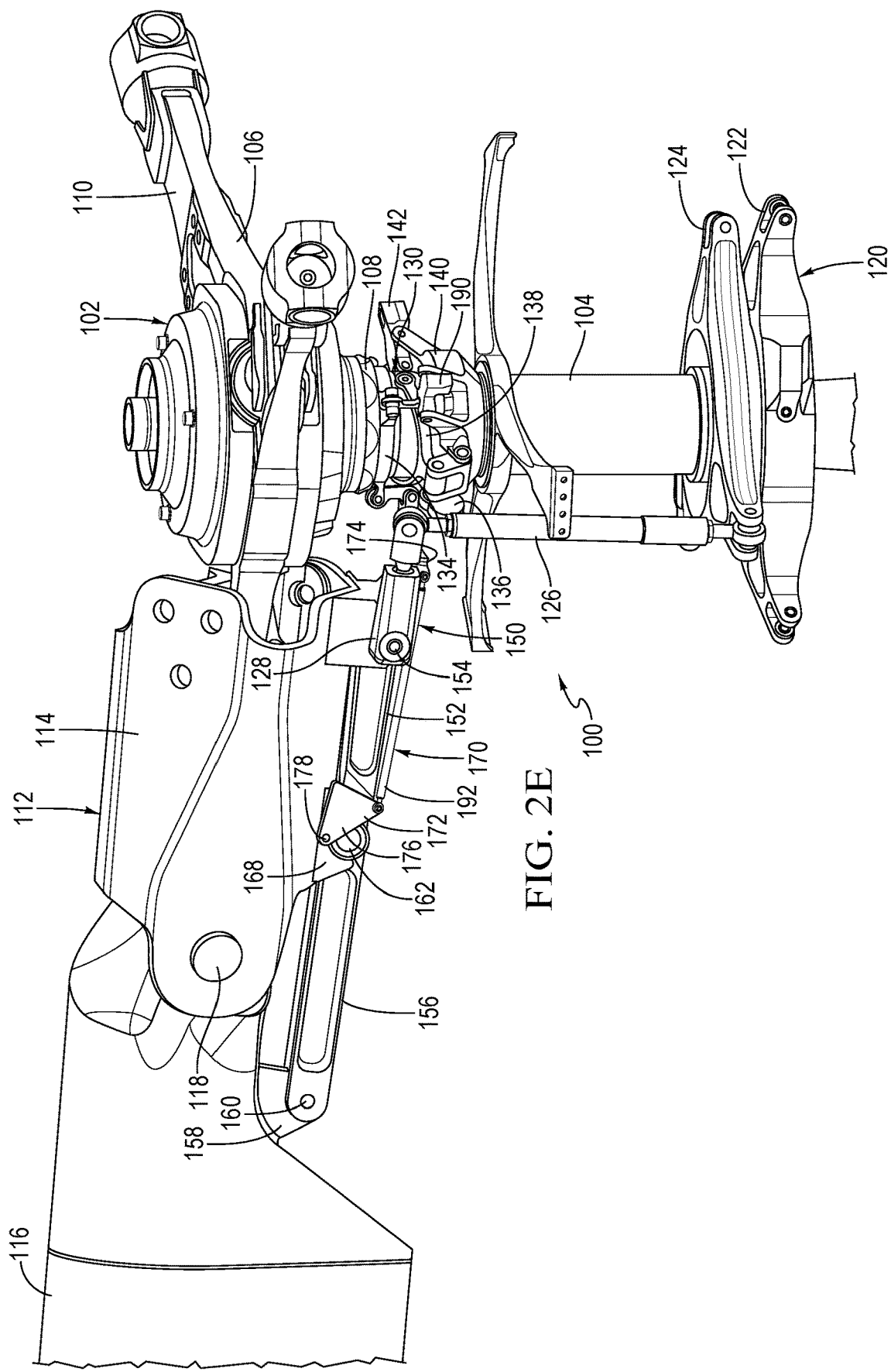

Next, actuators 194 are operated to shift blade locks 170 from the pitch lock position, depicted in FIG. 3C, to the fold lock position, depicted in FIGS. 2D and 3A. Actuator 194 simultaneously causes hasp 182 to rotate relative to lugs 184 of cuff 114 about pin 186 and arms 176 to rotate relative to seats 168 of cuff 114 about pins 178, as best seen in FIGS. 2D and 3B. At the end of travel, hasp 182 is remote from tab 188 of cuff 114 and tab 190 of arm 142, as best seen in FIG. 3A, which enables the pitching degree of freedom of rotor blade assemblies 112. Also, at the end of travel, wedges 180 have contacted roller element 166 seating flanges 164 tightly within seats 168 and disabling the folding degree of freedom of rotor blade assembly 112, as best seen in FIG. 3A. Swash plate 120 may now be used to collectively shift rotor blade assemblies 112 from the feathering position, as best seen in FIG. 1C, to a windmilling orientation.

To enable the gimballing degree of freedom of rotor assembly 102, actuator 136 is operated to cause lift ring 138 to lower actuation ring 134, which in turn lowers conical ring 132 out of engagement with conical receptacle 108 of rotor hub 106, as best seen in FIG. 2A. At the same time, responsive to lift ring 138 lower actuation ring 134, arms 142 shift from the radially extended orientation to the radially contracted orientation, as best seen in FIG. 2A, to provide clearance for rotor blade assemblies 112. Next, engines 24a, 24b are transitioned from turbofan mode to turboshaft mode such that forward thrust is provided by proprotor assemblies 20a, 20b and tiltrotor aircraft 10 is in the rotary flight mode. From this configuration, tiltrotor aircraft 10 may now be transitioned to helicopter mode when it is desired to hover and/or land the aircraft.

Figure 4:
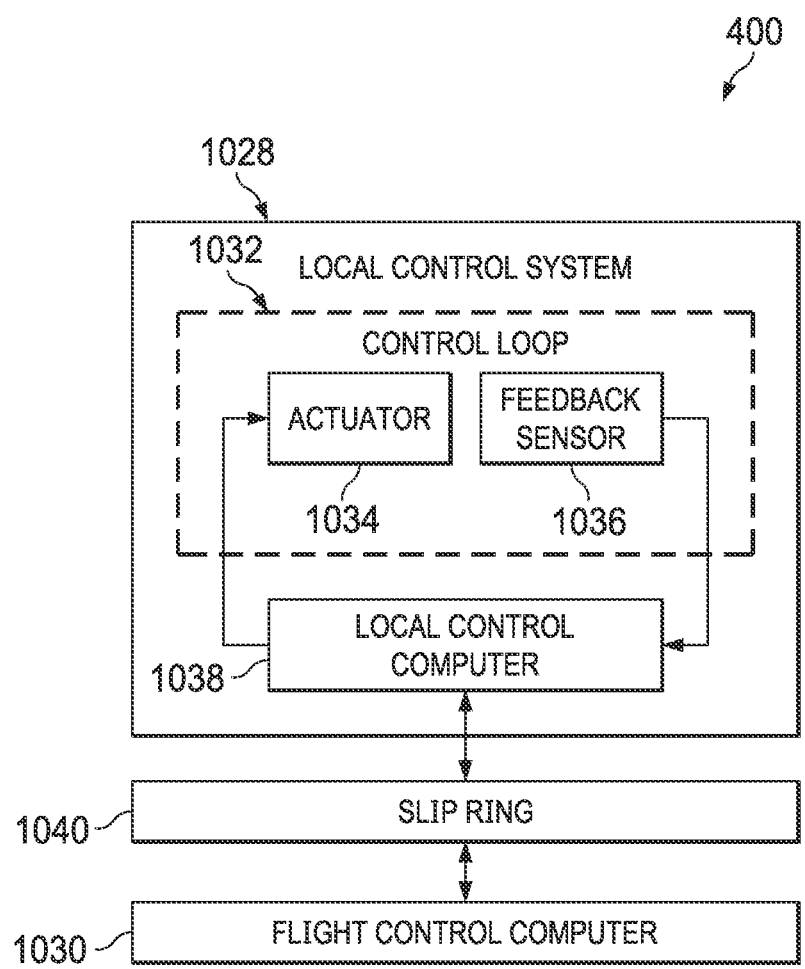
FIGS. 4-6 illustrate example control systems for controllable elements in a rotor assembly of a tiltrotor aircraft.

FIG. 4 illustrates an example of a control system 400 for controllable elements in a rotor assembly of a tiltrotor aircraft. The control system 400 includes a local control system 1028, a slip ring 1040 and a flight control computer 1030. The local control system 1028 can be considered an example of each of the local control systems 28a and 28b of FIGS. 1A-1D. In that way, the local control system 1028 can be mounted or otherwise disposed in a rotor assembly of a tiltrotor aircraft in similar fashion to the local control systems 28a and 28b. Also, the flight control computer 1030 can be considered an example of the flight control computer 30 of FIGS. 1A-1D, and thus can be located or disposed outside of, or external to, the rotor assembly in which the local control system 1028 is disposed or mounted.

In the illustrated embodiment, the local control system 1028 includes a control loop 1032 that is managed by a local control computer 1038. The local control computer 1038 can communicate with the flight control computer 1030 using any form of network or data communication, such as serial communication (e.g., RS-422, RS-485, etc.). The local control computer 1038 is connected to the flight control computer 1030 via the slip ring 1040. The slip ring 1040 can provide electrical connections and other connections between the local control computer 1038, which rotates with the rotor assembly, and the flight control computer 1030, which is external the rotor assembly and therefore does not rotate with rotor assembly. The slip ring 1040 can include, for example, non-rotating brushes conductively coupled to one side of each connection and slidingly engaging rotating rings that are conductively coupled to the other side of each connection.

The control loop 1032 includes an actuator 1034, such as a motor, paired with a feedback sensor 1036. The actuator 1034 and the feedback sensor 1036 can each be connected to the local control computer 1038 via an analog or digital connection. In general, the actuator 1034, when operated, controls motion of a controllable element within the rotor assembly in which the local control system 1028 is disposed or mounted. The local control computer 1038 can operate the actuator 1034, for example, by transmitting control signals, such as electric current, to the actuator 1034 in order to produce proportional motion. In an example, the actuator 1034 can be similar to the actuator 136 described above relative to FIGS. 2A-2G, such that it is operated to engage or disengage a gimbal lock such as the gimbal lock 130, thereby enabling or disabling a gimballing degree of freedom of the rotor assembly in which the local control system 1028 is disposed or mounted. In another example, the actuator 1034 can be similar to the actuators 194 described above relative to FIGS. 3A-3E, such that it is operated to shift blade locks from a pitch lock position to a fold lock position or from a fold lock position to a pitch lock position. Other examples of actuators will be apparent to one skilled in the art after reviewing the present disclosure.

In some cases, the local control computer 1038 can transmit the control signals to the actuator 1034 in response to receiving corresponding control commands transmitted through the slip ring 1040 by the flight control computer 1030. The local control computer 1038 can report received feedback to the flight control computer 1030. In addition, or alternatively, the local control computer 1038 can transmit the control signals to the actuator 1034 on its own initiative based on software or other control logic resident thereon. The feedback sensor 1036, in turn, can measure position, speed and/or other appropriate characteristics of the controllable element and provide, to the local control computer 1038, a feedback signal that includes, for example, information related to or derived from the measured characteristic(s). In a typical embodiment, the control loop 1032 is fully contained in the rotor assembly within which the local control system 1028 is disposed or mounted and thus may be considered "locally closed" relative to the rotor assembly.

In various embodiments, locally-closed control loops such as the control loop 1032 can provide various technical advantages. For example, wiring for communications related to locally-closed control loops such as the control loop 1032 can be contained to the rotor assembly in which the local control computer 1038 is mounted, and need not pass through the slip ring 1040 to the flight control computer 1030. This can decrease the amount of wiring through the slip ring 1040 and reduce susceptibility, for example, to electromagnetic interference. Furthermore, in certain embodiments, fault management and other functions can be performed locally by the local control computer 1038, thereby reducing communication overhead related to communicating with the flight control computer 1030 and relieving the flight control computer 1030 of the corresponding computational expense. For example, the local control computer 1038 can identify a fault in the rotor assembly, determine one or more remediation steps and utilize the control loop 1032 to implement the one or more remediation steps, for example, by transmitting a control signal to an actuator such as the 1034.

For illustrative purposes, the control loop 1032, the actuator 1034, the feedback sensor 1036, the local control computer 1038 and the flight control computer 1030 are each illustrated singly. However, in various embodiments, each of these illustrated components can be representative of plural such components in order to implement greater redundancy and reliability. For example, in certain embodiments, the local control computer 1038 can manage multiple control loops similar to the control loop 1032, each loop including a pairing of a distinct actuator and a distinct sensor similar to the actuator 1034 and the feedback sensor 1036, respectively, for purposes of providing redundant control paths for the same controllable element. According to this example, if, for instance, an actuator in one control loop were to experience failure, any one of the other redundant control loops would be sufficient to control motion of the controllable element.

In another example, the local control computer 1038 can be representative of more than one local control computer. According to this example, management of multiple control loops, for the same or different controllable elements, can be appropriately distributed among the local control computers. In some cases, according to this example, more than one of the local control computers can be configured to manage the same control loops, different control loops or overlapping sets of control loops. In addition, or alternatively, the flight control computer 1030 can be representative of more than one flight control computer. In an example, multiple flight control computers similar to the flight control computer 1030 could each communicate with and/or send commands to the same local control computers, different local control computers or overlapping sets of control computers.

Figure 5:
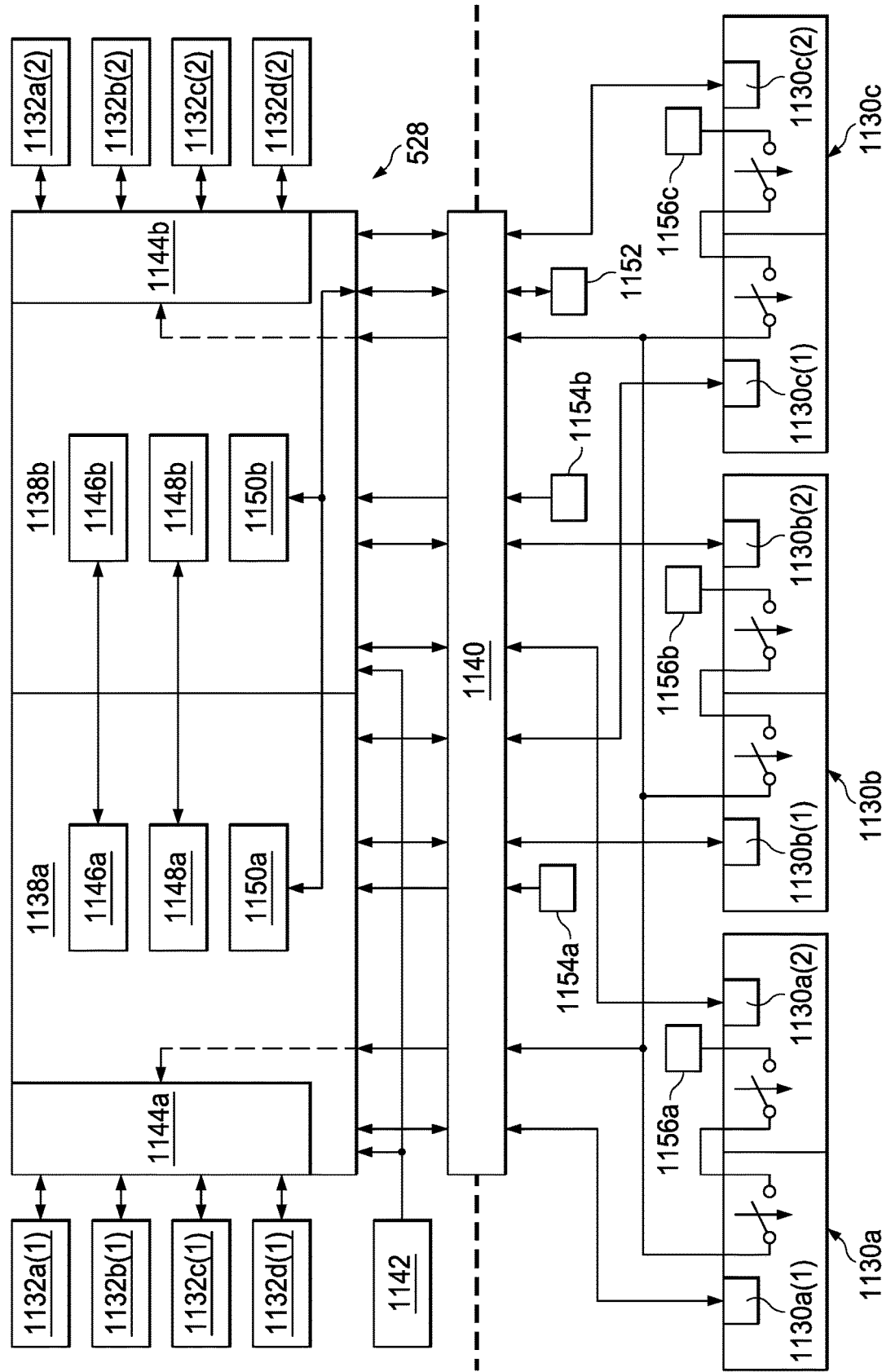

FIG. 5 illustrates an example of a control system 500 for a tiltrotor aircraft such as the aircraft 10 of FIGS. 1A-1D. For illustrative purposes, the control system 500 is shown to include a local control system 528 that further includes two local control computers, namely, local control computers 1138*a* and 1138*b*, and eight control loops, namely, control loops 1132*a*(1), 1132*b*(1), 1132*c*(1), 1132*d*(1), 1132*a*(2), 1132*b*(2), 1132*c*(2) and 1132*d*(2) (collectively, control loops 1132) and auxiliary sensor(s) 1142. The control system 500 further includes three flight control computers, namely, flight control computers 1130*a*, 1130*b* and 1130*c*, a slip ring 1140 and a remote computer 1152.

The control loops 1132 can each include a pairing of an actuator and a feedback sensor in a rotor assembly as described relative to the control loop 1032 of FIG. 4. More particularly, in the control system 500, the control loops 1132 are organized into four pairs, namely, control loops 1132*a*(1)-(2), 1132*b*(1)-(2), 1132*c*(1)-(2) and 1132*d*(1)-(2), such that, within each pair, the control loops supply redundant control paths for the same controllable element. For example, the control loops 1132*a*(1) and 1132*a*(2) can each include an actuator that controls motion of a first controllable element in the rotor assembly and a sensor that provides feedback relative to that controllable element. In that way, two actuators from two different control loops can be configured to control motion of the first controllable element, and two sensors from those two different control loops can be configured to provide feedback relative to the first controllable element. In like fashion, control loops 1132*b*(1)-(2), 1132*c*(1)-(2) and 1132*d*(1)-(2) can each collectively include two actuators and two sensors relative to second, third and fourth controllable elements, respectively.

For example, in the three-blade illustrative example of FIGS. 1A-3E, control loops 1132*a*(1)-(2), 1132*b*(1)-(2) and 1132*c*(1)-(2) can each correspond to a different proprotor blade and provide control and feedback relative to the shifting of blade locks from a pitch lock position to a fold lock position, or vice versa, in the fashion described above relative to FIGS. 3A-3E. Further, according to this example, control loops 1132*d*(1)-(2) can control and provide feedback relative to the engaging or disengaging of a gimbal lock in the fashion described above relative to FIGS. 2A-2G.

The auxiliary sensor(s) 1142 can serve a disambiguation function relative to the control loops 1132. As described previously, the example four pairs of control loops shown in FIG. 5, namely, the control loops 1132*a*(1)-(2), 1132*b*(1)-(2), 1132*c*(1)-(2) and 1132*d*(1)-(2), may each include two sensors that provide feedback relative to first, second, third and fourth controllable elements, respectively. In some cases, two sensors in a given control-loop pair might provide inconsistent feedback for the same controllable element, for example, due to a malfunction in one of the sensors. In certain embodiments, the auxiliary sensor(s) 1142 can resolve these discrepancies by providing an additional set of feedback of the same type provided by the other two sensors. The additional set of feedback can be used to identify erroneous feedback. In certain embodiments, the auxiliary sensor(s) 1142 can include four auxiliary sensors so that there is one auxiliary sensor for each of the four controllable elements. Advantageously, in certain embodiments, when an ambiguity or discrepancy occurs relative to the sensors of one of the control loops 1132*a*(1)-(2), 1132*b*(1)-(2), 1132*c*(1)-(2) and 1132*d*(1)-(2), a corresponding one of the auxiliary sensor(s) 1142 can be used to indicate which of the first two sensors is correct, thereby providing improved fault tolerance. An output of the auxiliary sensor(s) 1142 can be provided to one or both of the local control computers 1138*a* and 1138*b*.

The local control computer 1138*a* includes a driver 1144*a*, storage 1146*a*, a communication interface 1148*a* and a terminal connection 1150*a*. In similar fashion, the local control computer 1138*b* includes a driver 1144*b*, storage 1146*b*, a communication interface 1148*b* and a terminal connection 1150*b*. In general, the local control computers 1138*a* and 1138*b* can each operate as described with respect to the local control computer 1038 of FIG. 4, with management of the control loops 1132 being distributed between the two. In the illustrated example of FIG. 5, the first loop of each control-loop pair, namely, the control loops 1132*a*(1), 1132*b*(1), 1132*c*(1) and 1132*d*(1), is managed by the local control computer 1138*a*, with control signals being sent from, and feedback signals being received by, the driver 1144*a*. The second loop of each control-loop pair, namely, the control loops 1132*a*(2), 1132*b*(2), 1132*c*(2) and 1132*d*(2), is shown as being managed by the local control computer 1138*b*, with control signals being sent from, and feedback signals being received by, the driver 1144*b*.

In certain embodiments, the local control computers 1138*a* and 1138*b* can collaborate in the management, for example, of the four controllable elements to which the control loops 1132 relate. For example, the local control computers 1138*a* and 1138*b* can share data and reach an agreed-upon decision regarding what control signal should be transmitted to which actuator. Data sharing and decision making can occur in various fashions. For example, in certain embodiments, the local control computer 1138*a* can perform disk operations, such as read and write operations, on the storage 1146*b* of the local control computer 1138*b*. Similarly, the local control computer 1138*b* can perform disk operations, such as read and write operations, on the storage 1146a of the local control computer 1138a. In addition, or alternatively, the local control computers 1138a and 1138b can exchange data related to controllable elements, such as received feedback, via the communication interfaces 1148a and 1148b. In various embodiments, the agreed-upon decision about a given control signal can reached as a result of each of the local control computers 1138a and 1138b executing parallel logic based on the same information, as a result of the decision of a designated "master" or "primary" computer, combinations of the same and/or the like.

The local control computers 1138a and 1138b can remotely receive updates from a remote computer 1152 via the terminal connections 1150a and 1150b, respectively. In various embodiments, the remote computer 1152 can provide firmware or software updates, modify variable parameters stored in the storage 1146a and 1146b, retrieve fault codes from the storage 1146a and 1146b, combinations of the same and/or the like. In addition, in some embodiments, the terminal connections 1150a and 1150b can be used by the remote computer 1152 as instrumentation ports.

In general, the flight control computers 1130a, 1130b and 1130c can function and communicate through the slip ring 1140 in the fashion described relative to the flight control computer 1030 of FIG. 4. The flight control computers 1130a, 1130b and 1130c are shown to include first communication channels 1130a(1), 1130b(1) and 1130c(1), respectively, and second communication channels 1130a(2), 1130b(2) and 1130c(2), respectively.

In the example of FIG. 5, the flight control computers 1130a, 1130b and 1130c collectively provide three paths for communicating with the local control computer 1138a and three paths for communicating with the local control computer 1138b. The local control computer 1138a is communicably coupled, through the slip ring 1140, to the first communication channels 1130a(2), 1130b(2) and 1130c(2), respectively, of the flight control computers 1130a, 1130b and 1130c. The local control computer 1138b is shown to be communicably coupled, through the slip ring 1140, to the second communication channels 1130a(2), 1130b(2) and 1130c(2) of the flight control computers 1130a, 1130b and 1130c, respectively. In that way, all of the flight control computers 1130a, 1130b and 1130c can communicate a command, or receive feedback from, one or both of the local control computers 1138a and 1138b.

The slip ring 1140 can operate as described with respect to the slip ring 1040 of FIG. 4 and thereby facilitate the above-described communications between the local control computers 1138a and 1138b and the flight control computers 1130a, 1130b and 1130c. Additionally, the local control computers 1138a and 1138b can be powered, through the slip ring 1140, by buses 1154a and 1154b, respectively.

Furthermore, the flight control computers 1130a, 1130b and 1130c are electrically connected to signal generators 1156a, 1156b and 1156c, respectively, which generators are controllable by the flight control computers 1130a, 1130b and 1130c. The signal generators 1156a, 1156b and 1156c can produce an electrical or logical signal that enables the drivers 1144a and 1144b. In the illustrated embodiment, the signal generators 1156a, 1156b and 1156c are shown in a daisy-chain configuration in which any one of the flight control computers 1130a, 1130b and 1130c can enable or disable the driver 1144a and/or the driver 1144b. In certain embodiments, if, for example, a fault or other adverse situation in the rotor assembly is detected by one of the flight control computers 1130a, 1130b and 1130c, any of the flight control computers 1130a, 1130b and 1130c can disable, or terminate the control function of, the driver 1144a and/or the driver 1144b via the signal generators 1156a, 1156b and 1156c.

Figure 6:
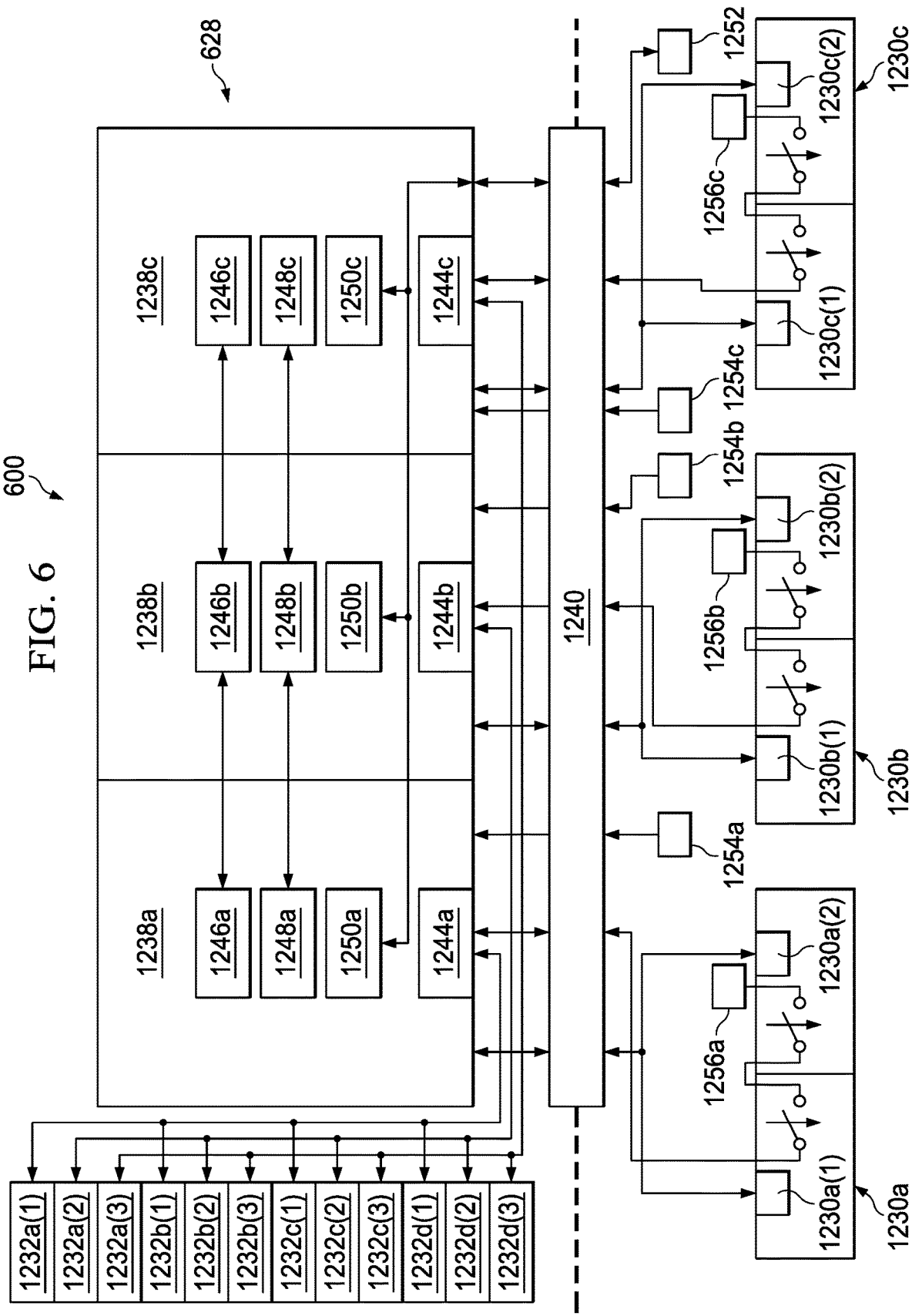

FIG. 6 illustrates an example of a control system 600 for a tiltrotor aircraft such as the aircraft 10 of FIGS. 1A-1D. For illustrative purposes, the control system 600 is shown to include a local control system 628 that further includes three local control computers, namely, local control computers 1238a, 1238b and 1238c, and twelve control loops, namely, control loops 1232a(1), 1232a(2), 1232a(3), 1232b(1), 1232b(2), 1232b(3), 1232c(1), 1232c(2), 1232c(3), 1232d(1), 1232d(2) and 1232d(3) (collectively, control loops 1232). The control system 600 further includes three flight control computers, namely, flight control computers 1230a, 1230b and 1230c, a slip ring 1240 and a remote computer 1252.

The control loops 1232 can each include a pairing of an actuator and a feedback sensor in a rotor assembly as described relative to the control loop 1032 of FIG. 4 and the control loops 1132 of FIG. 5. In the control system 600, the control loops 1232 are organized into four sets, namely, control loops 1232a(1)-(3) (collectively, control loops 1232a), 1232b(1)-(3) (collectively, control loops 1232b), 1232c(1)-(3) (collectively, control loops 1232c) and 1232d(1)-(3) (collectively, control loops 1232d), such that, within each set, the control loops supply redundant control paths for the same controllable element. For example, the control loops 1232a can each include an actuator that controls motion of a first controllable element in the rotor assembly and a sensor that provides feedback relative to that controllable element. In that way, three actuators from three different control loops can be configured to control motion of the first controllable element, and three sensors from those three different control loops can be configured to provide feedback relative to the first controllable element. In like fashion, the control loops 1232b, 1232c and 1232d can each collectively include three actuators and three sensors relative to second, third and fourth controllable elements, respectively.

For example, in the three-blade illustrative example of FIGS. 1A-3E, the control loops 1232a, 1232b and 1232c can each correspond to a different proprotor blade and provide control and feedback relative to the shifting of blade locks from a pitch lock position to a fold lock position, or vice versa, in the fashion described above relative to FIGS. 3A-3E. Further, according to this example, the control loops 1232d can control and provide feedback relative to the engaging or disengaging of a gimbal lock in the fashion described above relative to FIGS. 2A-2G. In contrast to the control system 500 of FIG. 5, no auxiliary sensors are illustrated in the control system 600. In certain embodiments, the disambiguation function served, for example, by the auxiliary sensor(s) 1142 of FIG. 5, is unnecessary in the control system 600 due to the fact that the control loops 1232a, 1232b, 1232c and 1232d each include, in total, three sensors, thereby providing built-in fault tolerance when, for example, a single sensor malfunctions.

The local control computers 1238a, 1238b and 1238c include, respectively, drivers 1244a, 1244b and 1244c, storage 1246a, 1246b and 1246c, communication interfaces 1248a, 1248b and 1248c, and terminal connections 1250a, 1250b and 1250c. In general, the foregoing example components of the local control computers 1238a, 1238b and 1238c can perform similarly to the components of the same name that are shown and described with respect to the local control computers 1138a and 1138b of FIG. 5. Likewise, the local control computers 1238a, 1238b and 1238c can each operate as described with respect to the local control computer 1038 of FIG. 4, with management of the control loops 1232 being distributed among the three computers.

In the illustrated example of FIG. 6, the first loop of each control-loop set, namely, the control loops 1232a(1), 1232b(1), 1232c(1) and 1232d(1), is managed by the local control computer 1238a, with control signals being sent from, and feedback signals being received by, the driver 1244a. The second loop of each control-loop set, namely, the control loops 1232a(2), 1232b(2), 1232c(2) and 1232d(2), is shown as being managed by the local control computer 1238b, with control signals being sent from, and feedback signals being received by, the driver 1244b. Further, the third loop of each control-loop set, namely, the control loops 1232a(3), 1232b(3), 1232c(3) and 1232d(3), is shown as being managed by the local control computer 1238c, with control signals being sent from, and feedback signals being received by, the driver 1244c.

For simplicity of illustration, direct connections between the local control computer 1238a and the local control computer 1238c are not explicitly shown in FIG. 6. However, it should be appreciated that the connections shown, for example, between the storage 1246a and the storage 1246b, can also exist between the storage 1246a and the storage 1246c. Similarly, the connections shown, for example, between the communication interface 1248a and the communication interface 1248b, can likewise exist between the communication interface 1248a and the communication interface 1248c.

In certain embodiments, the local control computers 1238a, 1238b and 1238c can collaborate in the management of the four controllable elements to which the control loops 1232 relate. For example, the local control computers 1238a, 1238b and 1238c can share data and reach an agreed-upon decision regarding what control signal should be transmitted to which actuator. Data sharing and decision making can occur in various fashions. For example, in certain embodiments, the local control computer 1238a can perform disk operations, such as read and write operations, on the storage 1246b of the local control computer 1238b and/or the storage 1246c of the local control computer 1238c. Similarly, the local control computer 1238b can perform disk operations, such as read and write operations, on the storage 1246a of the local control computer 1238a and/or the storage 1246c of the local control computer 1238c. In addition, or alternatively, the local control computers 1238a, 1238b and 1238c can exchange data related to controllable elements, such as received feedback, via the communication interfaces 1248a, 1248b and 1248c. In various embodiments, the agreed-upon decision about a given control signal can reached as a result of each of the local control computers 1238a, 1238b and 1238c executing parallel logic based on the same information, as a result of the decision of a designated "master" or "primary" computer, combinations of the same and/or the like.

The local control computers 1238a, 1238b and 1238c can remotely receive updates from the remote computer 1252 via the terminal connections 1250a, 1250b and 1250c, respectively. In various embodiments, the remote computer 1252 can provide firmware updates, modify variable parameters stored in the storage 1246a, 1246b and 1246c, retrieve fault codes from the storage 1246a, 1246b and 1246c, combinations of the same and/or the like. In addition, in some embodiments, the terminal connections 1250a, 1250b and 1250c can be used by the remote computer 1252 as instrumentation ports.

In general, the flight control computers 1230a, 1230b and 1230c can function and communicate through the slip ring 1240 in the fashion described relative to the flight control computer 1030 of FIG. 4. The flight control computers 1230a, 1230b and 1230c are shown to include first communication channels 1230a(1), 1230b(1) and 1230c(1), respectively, and second communication channels 1230a(2), 1230b(2) and 1230c(2), respectively.

In the example of FIG. 6, the flight control computers 1230a, 1230b and 1230c collectively provide multiple redundant paths for transmitting commands, or receiving feedback relative to, the four controllable elements controlled via the control loops 1232. The local control computer 1238a is communicably coupled, through the slip ring 1240, to both the first communication channel 1230a(1) and the second communication channel 1230a(2) of the flight control computer 1230a. The local control computer 1238b is shown to be communicably coupled, through the slip ring 1240, to both the first communication channel 1230b(1) and the second communication channel 1230b(2) of the flight control computer 1230b. The local control computer 1238c is shown to be communicably coupled, through the slip ring 1240, to both the first communication channel 1230c(1) and the second communication channel 1230c(2) of the flight control computer 1230c. In that way, all of the flight control computers 1230a, 1230b and 1230c can communicate a command, or receive feedback relative to, any of the four controllable elements controlled by the control loops 1232.

The slip ring 1240 can operate as described with respect to the slip ring 1040 of FIG. 4 and thereby facilitate the above-described communications between the local control computers 1238a, 1238b and 1238c and the flight control computers 1230a, 1230b and 1230c. Additionally, the local control computers 1238a, 1238b and 1238c can be powered, through the slip ring 1240, by buses 1254a, 1254b and 1254c, respectively.

Furthermore, the flight control computers 1230a, 1230b and 1230c are electrically connected to signal generators 1256a, 1256b and 1256c, respectively, which generators are controllable by the flight control computers 1230a, 1230b and 1230c. The signal generators 1256a, 1256b and 1256c can produce an electrical or logical signal that enables the drivers 1244a, 1244b and 1244c, respectively. In certain embodiments, if, for example, a fault or other adverse situation in the rotor assembly is detected by one of the flight control computers 1230a, 1230b and 1230c, the flight control computer 1230a can disable, or terminate the control function of, the driver 1244a. The flight control computers 1230b and 1230c can take similar action relative to the drivers 1244b and 1244c, respectively.

Figure 7:
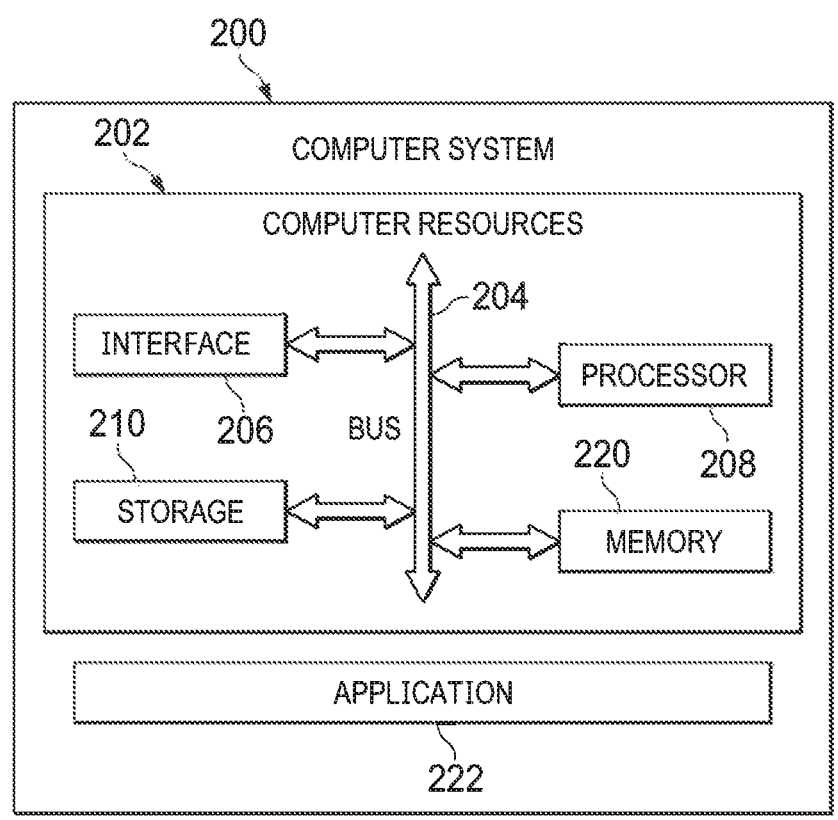
FIG. 7 illustrates an example of a computer system that can serve as a central control computer or a local control computer.

FIG. 7 illustrates an example of a computer system 200. In some cases, the computer system 200 can be representative, for example, of a flight control computer such as, for example, the flight control computer 1030 of FIG. 4, the flight control computers 1130a, 1130b and 1130c of FIG. 5, and/or the flight control computers 1230a, 1230b and 1230C of FIG. 6. In addition, in some cases, the computer system 200 can be representative, for example, of a local control computer such as, for example, the local control computer 1038 of FIG. 4, the local control computers 1138a and 1138b of FIG. 5, and the local control computers 1238a, 1238b and 1238c of FIG. 6.

The computer system 200 includes an application 222 operable to execute on computer resources 202. The application 222 can include, for example, logic for determining what control signal to send, which actuator should send a control signal, whether a fault has occurred, what action to take in light of a fault, combinations of the foregoing and/or the like. In particular embodiments, the computer system 200 may perform one or more actions described or illustrated herein. In particular embodiments, one or more computer systems may provide functionality described or illustrated herein. In particular embodiments, encoded software running on one or more computer systems may perform one or more actions described or illustrated herein or provide functionality described or illustrated herein.

The components of the computer system 200 may include any suitable physical form, configuration, number, type and/or layout. As an example, and not by way of limitation, the computer system 200 may include an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 200 may include one or more computer systems; be unitary or distributed; span multiple locations; span multiple machines; or reside in a cloud, which may include one or more cloud components in one or more networks.

In the depicted embodiment, the computer system 200 includes a processor 208, memory 220, storage 210, interface 206, and bus 204. Although a particular computer system is depicted having a particular number of particular components in a particular arrangement, this disclosure contemplates any suitable computer system having any suitable number of any suitable components in any suitable arrangement.

Processor 208 may be a microprocessor, controller, or any other suitable computing device, resource, or combination of hardware, software and/or encoded logic operable to execute, either alone or in conjunction with other components, (e.g., memory 220), the application 222. Such functionality may include providing various features discussed herein. In particular embodiments, processor 208 may include hardware for executing instructions, such as those making up the application 222. As an example, and not by way of limitation, to execute instructions, processor 208 may retrieve (or fetch) instructions from an internal register, an internal cache, memory 220, or storage 210; decode and execute them; and then write one or more results to an internal register, an internal cache, memory 220, or storage 210.

In particular embodiments, processor 208 may include one or more internal caches for data, instructions, or addresses. This disclosure contemplates processor 208 including any suitable number of any suitable internal caches, where appropriate. As an example, and not by way of limitation, processor 208 may include one or more instruction caches, one or more data caches, and one or more translation lookaside buffers (TLBs). Instructions in the instruction caches may be copies of instructions in memory 220 or storage 210 and the instruction caches may speed up retrieval of those instructions by processor 208. Data in the data caches may be copies of data in memory 220 or storage 210 for instructions executing at processor 208 to operate on; the results of previous instructions executed at processor 208 for access by subsequent instructions executing at processor 208, or for writing to memory 220, or storage 210; or other suitable data. The data caches may speed up read or write operations by processor 208. The TLBs may speed up virtual-address translations for processor 208. In particular embodiments, processor 208 may include one or more internal registers for data, instructions, or addresses. Depending on the embodiment, processor 208 may include any suitable number of any suitable internal registers, where appropriate. Where appropriate, processor 208 may include one or more arithmetic logic units (ALUs); be a multi-core processor; include one or more processors 208; or any other suitable processor.

Memory 220 may be any form of volatile or non-volatile memory including, without limitation, magnetic media, optical media, random access memory (RAM), read-only memory (ROM), flash memory, removable media, or any other suitable local or remote memory component or components. In particular embodiments, memory 220 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 220 may include one or more memories 220, where appropriate. Memory 220 may store any suitable data or information utilized by the computer system 200, including software embedded in a computer readable medium, and/or encoded logic incorporated in hardware or otherwise stored (e.g., firmware). In particular embodiments, memory 220 may include main memory for storing instructions for processor 208 to execute or data for processor 208 to operate on. In particular embodiments, one or more memory management units (MMUs) may reside between processor 208 and memory 220 and facilitate accesses to memory 220 requested by processor 208.

As an example, and not by way of limitation, the computer system 200 may load instructions from storage 210 or another source (such as, for example, another computer system) to memory 220. Processor 208 may then load the instructions from memory 220 to an internal register or internal cache. To execute the instructions, processor 208 may retrieve the instructions from the internal register or internal cache and decode them. During or after execution of the instructions, processor 208 may write one or more results (which may be intermediate or final results) to the internal register or internal cache. Processor 208 may then write one or more of those results to memory 220. In particular embodiments, processor 208 may execute only instructions in one or more internal registers or internal caches or in memory 220 (as opposed to storage 210 or elsewhere) and may operate only on data in one or more internal registers or internal caches or in memory 220 (as opposed to storage 210 or elsewhere).

In particular embodiments, storage 210 may include mass storage for data or instructions. As an example, and not by way of limitation, storage 210 may include a hard disk drive (HDD), a floppy disk drive, flash memory, an optical disc, a magneto-optical disc, magnetic tape, or a Universal Serial Bus (USB) drive or a combination of two or more of these. Storage 210 may include removable or non-removable (or fixed) media, where appropriate. Storage 210 may be internal or external to the computer system 200, where appropriate. In particular embodiments, storage 210 may be non-volatile, solid-state memory. In particular embodiments, storage 210 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 210 may take any suitable physical form and may include any suitable number or type of storage. Storage 210 may include one or more storage control units facilitating communication between processor 208 and storage 210, where appropriate.

In particular embodiments, interface 206 may include hardware, encoded software, or both providing one or more interfaces for communication (such as, for example, packetbased communication) among any networks, any network devices, and/or any other computer systems. As an example, and not by way of limitation, communication interface 206 may include a network interface controller (NIC) or network adapter for communicating with an Ethernet or other wire-based network and/or a wireless NIC (WNIC) or wireless adapter for communicating with a wireless network.

Depending on the embodiment, interface 206 may be any type of interface suitable for any type of network for which computer system 200 is used. As an example, and not by way of limitation, computer system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 200 may include any suitable interface 206 for any one or more of these networks, where appropriate.

In some embodiments, interface 206 may include one or more interfaces for one or more I/O devices. One or more of these I/O devices may enable communication between a person and the computer system 200. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 206 for them. Where appropriate, interface 206 may include one or more drivers enabling processor 208 to drive one or more of these I/O devices. Interface 206 may include one or more interfaces 206, where appropriate.

Bus 204 may include any combination of hardware, software embedded in a computer readable medium, and/or encoded logic incorporated in hardware or otherwise stored (e.g., firmware) to couple components of the computer system 200 to each other. As an example, and not by way of limitation, bus 204 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 204 may include any number, type, and/or configuration of buses 204, where appropriate. In particular embodiments, one or more buses 204 (which may each include an address bus and a data bus) may couple processor 208 to memory 220. Bus 204 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 208 (such as, for example, one or more internal registers or caches), one or more portions of memory 220, one or more portions of storage 210, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Although various illustrative examples are described above relative to tiltrotor aircraft, it should be appreciated that the principles described herein can similarly be applied to other rotorcraft such as helicopters, cyclocopters, autogyros, gyrodynes and rotor kites. It should also be appreciated that, in various embodiments, the control principles described herein can also be applied to non-rotorcraft machines and apparatus that include rotor assemblies. For example, in certain embodiments, a local control system can be disposed in a rotor assembly of a wind or water turbine and can include one or more local control loops of the type described with respect to FIGS. 4-6. Further, the local control system can communicate with one or more central control computers similar to the flight control computers described above, except that such computers would control operational aspects of wind or water turbines instead of flight. The one or more central control computers can be located, for example, external to the rotor assembly on the wind or water turbine. The one or more central control computers can also be located external to the wind or water turbine, for example, in cases where the one or more central control computers communicate with groups or collections of wind or water turbines.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language. The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. An apparatus comprising:
a rotor assembly, wherein the rotor assembly rotates in response to torque and rotational energy provided thereto;
a first controllable element disposed in the rotor assembly;
a first actuator disposed in the rotor assembly and configured to control motion of the first controllable element;
a first sensor disposed in the rotor assembly and configured to provide position feedback in relation to the first controllable element;
a first local control computer, disposed in the rotor assembly, that manages a first control loop for the first controllable element, wherein the first control loop comprises the first actuator and the first sensor, and wherein the first local control computer is configured to transmit a control signal to the first actuator and receive a feedback signal from the first sensor;
a second actuator disposed in the rotor assembly and configured to control motion of the first controllable element;
a second sensor disposed in the rotor assembly and configured to provide position feedback in relation to the first controllable element;
a second local control computer, disposed in the rotor assembly, that manages a second control loop for the first controllable element, wherein the second control loop comprises the second actuator and the second sensor, and wherein the second local control computer is configured to transmit a control signal to the second actuator and receive a feedback signal from the second sensor;
a first central control computer disposed in the apparatus external to the rotor assembly, wherein the first central control computer is communicably coupled to the first local control computer; and
a signal generator disposed in the apparatus external to the rotor assembly, wherein the signal generator is connected to the first central control computer and is controllable by the first central control computer to terminate a control function in the rotor assembly.

2. The apparatus of claim 1, comprising:
a slip ring, the slip ring providing an electrical connection between the first local control computer and the first central control computer; and
wherein the first local control computer receives a control command from the first central control computer through the slip ring.

3. The apparatus of claim 1, wherein the first local control computer and the second local control computer are communicably coupled and configured to exchange data related to the first controllable element.

4. The apparatus of claim 1, comprising:
an auxiliary sensor disposed in the rotor assembly and configured to provide position feedback in relation to the first controllable element; and
wherein at least one of the first local control computer and the second local control computer is configured to receive a feedback signal from the auxiliary sensor.

5. The apparatus of claim 1, comprising:
a second central control computer disposed in the apparatus external to the rotor assembly; and
wherein the second local control computer is communicably coupled to the second central control computer and configured to receive a command from the second central control computer.

6. The apparatus of claim 5, wherein:
the second local control computer is communicably coupled to the first central control computer and configured to receive a command from the first central control computer; and
the first local control computer is communicably coupled to the second central control computer and configured to receive a command from the second central control computer.

7. The apparatus of claim 5, comprising:
a third central control computer disposed in the apparatus external to the rotor assembly; and
wherein the first local control computer and the second local control computer are each communicably coupled to the third central control computer and configured to receive a command from the third central control computer.

8. The apparatus of claim 5, comprising:
a third actuator disposed in the rotor assembly and configured to control motion of the first controllable element;
a third sensor disposed in the rotor assembly and configured to provide position feedback in relation to the first controllable element;
a third central control computer disposed in the apparatus external to the rotor assembly; and
a third local control computer disposed in the rotor assembly and communicably coupled to the third central control computer, wherein the third local control computer is configured to transmit a control signal to the third actuator and receive a feedback signal from the third sensor.

9. The apparatus of claim 8, wherein the third local control computer is communicably coupled to the first local control computer and the second local control computer and is configured to exchange data related to the first controllable element.

10. The apparatus of claim 8, comprising:
a fourth actuator, a fifth actuator and a sixth actuator that are each disposed in the rotor assembly and configured to control motion of a second controllable element in the rotor assembly;
a fourth sensor, a fifth sensor and a sixth sensor that are each disposed in the rotor assembly and configured to provide position feedback in relation to the second controllable element;
wherein the first local control computer is configured to transmit a control signal to the fourth actuator and receive a feedback signal from the fourth sensor;
wherein the second local control computer is configured to transmit a control signal to the fifth actuator and receive a feedback signal from the fifth sensor; and
wherein the third local control computer is configured to transmit a control signal to the sixth actuator and receive a feedback signal from the sixth sensor.

11. The apparatus of claim 1, wherein the first local control computer is configured to receive an update via a remote terminal connection.

12. The apparatus of claim 1, wherein:
the apparatus is an aircraft; and
the rotor assembly is rotated responsive to torque and rotational energy provided by an engine of the aircraft.

13. A method comprising:
transmitting, by a first local control computer in a rotor assembly of an apparatus, a first control signal to a first actuator in the rotor assembly, wherein the rotor assembly is mounted to the apparatus and is rotated responsive to torque and rotational energy provided thereto, and wherein the first actuator is configured to control motion of a first controllable element in the rotor assembly;
receiving, by the first local control computer, a first feedback signal from a first sensor in the rotor assembly, the first feedback signal comprising position feedback in relation to the first controllable element;
transmitting, by a second local control computer in the rotor assembly of the apparatus, a second control signal to a second actuator in the rotor assembly, wherein the second actuator is configured to control motion of the first controllable element;
receiving, by the second local control computer, a second feedback signal from a second sensor in the rotor assembly, the second feedback signal comprising position feedback in relation to the first controllable element;
by the first local control computer:
identifying a fault in the rotor assembly; and
determining a remediation step responsive to the fault; and
wherein the transmitting is performed responsive to the determined remediation.

14. The method of claim 13, comprising, prior to the transmitting by the first local control computer:
the first local control computer exchanging data with the second local control computer; and
based at least in part on the exchanged data, the first local control computer determining an agreed-upon decision related to the first control signal.

15. The method of claim 13, comprising transmitting, by the first local control computer, information related to the first feedback signal to a central control computer disposed in the apparatus external to the rotor assembly.

* * * * *